United States Patent
Schaaf

(10) Patent No.: US 9,532,685 B2
(45) Date of Patent: *Jan. 3, 2017

(54) SYSTEMS AND METHODS FOR TRANSPORTING BIO-WASTE

(71) Applicants: Jerry D. Thom, Sandy, UT (US); Catherine A. Thom, Sandy, TN (US)

(72) Inventor: Vincent Paul Schaaf, Salt Lake City, UT (US)

(73) Assignees: Jerry D. Thom, Sandy, UT (US); Catherine A. Thom, Sandy, UT (US)

( * ) Notice: Subject to any disclaimer, the term of this patent is extended or adjusted under 35 U.S.C. 154(b) by 90 days.

This patent is subject to a terminal disclaimer.

(21) Appl. No.: 14/324,805

(22) Filed: Jul. 7, 2014

(65) Prior Publication Data

US 2014/0321953 A1    Oct. 30, 2014

Related U.S. Application Data

(63) Continuation of application No. 13/353,031, filed on Jan. 18, 2012, now Pat. No. 8,769,734, which is a (Continued)

(51) Int. Cl.
*A47K 17/00* (2006.01)
*A47K 11/02* (2006.01)
(Continued)

(52) U.S. Cl.
CPC ............... *A47K 11/02* (2013.01); *C05F 3/04* (2013.01); *E04B 5/02* (2013.01); *E04B 5/48* (2013.01)

(58) Field of Classification Search
CPC .................. A47K 17/00; B09B 3/0075
(Continued)

(56) References Cited

U.S. PATENT DOCUMENTS

| 96,767 A | 11/1869 | Baird |
|---|---|---|
| 109,276 A | 11/1870 | Vanderveer |

(Continued)

FOREIGN PATENT DOCUMENTS

| WO | WO2005/054594 | 6/2005 |
|---|---|---|
| WO | WO2006/118578 | 11/2006 |

OTHER PUBLICATIONS

"Bedding Materials," adapted from Dairy Housing and Equipment Handbook, Midwest Plan Service, Publication No. 7, 1985.

(Continued)

*Primary Examiner* — Paul R Durand
*Assistant Examiner* — Nicholas Ros
(74) *Attorney, Agent, or Firm* — Workman Nydegger

(57) ABSTRACT

A remote-controlled vehicle for collecting and transporting bio-waste that is capable of compacting bio-waste, dumping the waste in a variety of ways, and that has a rechargeable battery, among other functions, is disclosed. A system for collecting the bio-waste material also is provided. The system includes a plurality of collection receptacles associated with a structure, each of the plurality of collection receptacles receiving the bio-waste material without the use of water as a carrier. A transport network extends from each of the plurality of collection receptacles to at least one storage receptacle located at the structure. A plurality of vehicles, or carts, is disposed within the transport network and collect the bio-waste material.

20 Claims, 15 Drawing Sheets

Related U.S. Application Data continuation of application No. 11/932,983, filed on Oct. 31, 2007, now Pat. No. 8,266,739, which is a continuation-in-part of application No. 11/119,842, filed on May 2, 2005, now abandoned, which is a continuation-in-part of application No. 10/725,217, filed on Dec. 1, 2003, now abandoned, said application No. 11/932,983 is a continuation-in-part of application No. 11/537,470, filed on Sep. 29, 2006, now abandoned, which is a continuation of application No. 10/725,217, filed on Dec. 1, 2003, now abandoned.

(51) Int. Cl.
*C05F 3/04* (2006.01)
*E04B 5/02* (2006.01)
*E04B 5/48* (2006.01)

(58) Field of Classification Search
USPC ..... 4/449, 484, 661; 406/120; 414/467, 810, 414/611; 702/188; 110/346
See application file for complete search history.

(56) References Cited

U.S. PATENT DOCUMENTS

| | | | |
|---|---|---|---|
| 258,006 A | 5/1882 | Behrens | |
| 2,067,958 A * | 1/1937 | Wallace | A47K 11/105 4/482 |
| 3,488,780 A * | 1/1970 | Ames | A47K 11/02 4/315 |
| 3,564,618 A | 2/1971 | Williams | |
| 3,665,522 A | 5/1972 | Backlund et al. | |
| 3,906,874 A | 9/1975 | Jaronko et al. | |
| 3,908,336 A * | 9/1975 | Forslund | B65B 9/15 4/484 |
| 4,046,271 A * | 9/1977 | Klosk | B65F 1/10 232/43.2 |
| 4,279,563 A * | 7/1981 | Miller | B66B 11/006 191/2 |
| 4,670,227 A * | 6/1987 | Smith | A61L 11/00 280/33.998 |
| 4,902,482 A | 2/1990 | Faust | |
| 4,999,857 A | 3/1991 | Mohrman | |
| 5,068,926 A | 12/1991 | Suzuki | |
| 5,173,866 A * | 12/1992 | Neumann | B30B 9/3007 100/229 A |
| 5,183,293 A | 2/1993 | Julian | |
| 5,720,438 A | 2/1998 | Devine et al. | |
| 5,832,623 A | 11/1998 | Nagumo et al. | |
| 5,879,221 A | 3/1999 | Barton et al. | |
| 5,884,346 A * | 3/1999 | Hengl | A47K 11/026 4/484 |
| 5,901,385 A | 5/1999 | Nian | |
| 5,944,607 A | 8/1999 | Crane | |
| 5,960,710 A | 10/1999 | Holtom | |
| 6,081,940 A | 7/2000 | Nien | |
| 6,190,429 B1 * | 2/2001 | Fujimura | C10J 3/523 110/245 |
| 6,264,528 B1 | 7/2001 | Doan et al. | |
| 6,335,192 B1 | 1/2002 | Östbo | |
| 6,766,751 B2 * | 7/2004 | Liu | B65F 1/1484 110/341 |
| 7,073,212 B1 | 7/2006 | Moffat | |
| 7,144,550 B2 | 12/2006 | Devine et al. | |
| 7,216,376 B2 | 5/2007 | Samules | |
| 8,092,141 B2 | 1/2012 | Curotto et al. | |
| 8,266,739 B2 * | 9/2012 | Schaaf | A47K 11/02 232/43.1 |
| 8,550,252 B2 * | 10/2013 | Borowski | G06Q 99/00 209/3 |
| 8,769,734 B2 * | 7/2014 | Schaaf | A47K 11/02 232/43.1 |
| 2005/0114993 A1 | 6/2005 | Schaaf | |
| 2005/0209825 A1 * | 9/2005 | Ogawa | B65F 1/1484 702/188 |
| 2005/0210573 A1 | 9/2005 | Schaaf | |
| 2008/0087717 A1 | 4/2008 | Schaaf | |
| 2008/0222785 A1 | 9/2008 | Irizarry-Lugo | |
| 2012/0111699 A1 | 5/2012 | Schaaf | |

OTHER PUBLICATIONS

Beder, S., "Early Environmentalists and the Battle Against Sewers in Sydney," Royal Australian Historical Society Journal, Jun. 1, 1990, vol. 76, No. 1, pp. 27-44, as published online at <http://www.uow.edu.au/arts/sts/sbeder/sewage/history.html>, pp. 1-10.

"Biomass for Energy," as published at <http://www.bbc.co.uk/nature/plants/features/185index.shmtl>, pp. 1-2.

"Biomass Power," U.S. Department of Energy—Energy Efficiency and Renewable Energy, Distributed Energy Program, as published at <http://www.eere.energy.gov/de/basics/der_basics_dertech_pwr_ren_bio.shtml>, pp. 1-4.

Brand, J., "Water, water everywhere . . . and not a drop to drink," reposted from The Yellow Times, Dec. 16, 2002, as published online at CommUnity of Minds <http://solutions.synearth.net/2002/12/16>, pp. 1-5.

Cellulose Insulation <http://www.greenresourcecenter.org/MaterialsSheets/CelluloseInsulation.html>, pp. 1-3.

"Chapter 4: Water Management Options," as published at <http://www.sustainablenc.org/thewaytogo/water/chap_4.htm>.

"Chapter 7—The future of renewable biological energy systems," as published at <http://www.fao.org/docrep/w7241e/w7241e0i.htm> pp. 1-10.

"Chapter 10: Biomass Energy," as published at <http://www.energyquest.ca.gov/story/chapter10.html>, pp. 1-2.

"Chapter 17: Renewable Energy vs. Fossil Fuels," as published at <http://www.energyquest.ca.gov/story/chapter17.html>, pp. 1-2.

"Chapter three: The raw materials of biogas digestion," as published at <http://mng-unix1.marasconewton.com/peaceorps/Documents/R0048/r0048e/r0048e05.htm>, pp. 1-8.

Clivus Multrum Composting Toilets <http://www.clivus.com>.

"Colloids," published by Facts on File, Inc., 1998, pp. 1-4.

"Composting Toilets: A Tankful of Conservation," Home Energy Magazine Online Jan./Feb. 1996, as published at <http://hem.dis.anl.gov/eehem/96/960106.html>, pp. 1-4.

"Corn Stover for Bioethanol—Your New Cash Crop?" produced by the National Renewable Energy Laboratory, a U.S. Department of Energy National Laboratory, Feb. 2001.

Cotuit Dry Toilets <http://www.cape.com/cdt/cutaway.html>.

Couch, C., "Eco Dorm Water Analysis," as published online at Eco Dorm <http://www.uidaho.edu/ecodorm/waterreport.html> pp. 1-15.

D'Vour Absorbent Powder, Lemon <http://www.biz4usa.com/cgi-bin/miva?Merchant2/merchant.mv+Screen=PROD&Store_Code=SEJS&Product_Code=BGD166>.

"Dyn-O-Mat Promises Clear Skies . . . New storm-fighting product dissipates clouds," as published online at <http://www.anomalies-unlimited.com/Chemtrails/Dyn-O-Gel.html>, pp. 1-3.

Envirolet Composting Toilets <www.envirolet.com>.

"Every Drop Counts," Reeves Journal, Dec. 14, 2000, as published at <http://www.reevesjournal.com/rj/cda/articleinformation/coverstory/bnpcoverstoryitem/0,,16621,00+en-uss_01dbc.html>, pp. 1-4.

Falcon WaterFree Technologies <http://www.falconwaterfree.com>.

"Fun with Diapers Hygroscopic Chemicals," as published at <http://www.wcsscience.com/diaper/fun.html>, pp. 1-3.

Garden State Environews <http://www.gsenet.org/library/11gsn/1999/gs90704-.php>.

lsraelsen, B., "Jordan Valley Offers Toilets as Cheap Way to Save Water" Salt Lake Tribune, Sep. 2, 2002, as published online at Salt Lake Tribune <http://www.sltrib.com/2002/sep/09022002/utah/767489.htm>, pp. 1-3.

(56) References Cited

OTHER PUBLICATIONS

Judge, T., "Kvaerner Joins Masada Oxynol Team to Build New York Garbage-To-Ethanol Plant," as published online at MASADA OxyNol <http://www.masada.com/kvaerner.html> pp. 1-2.
Kirsner, S., "Breakout Artist," as published at <http://www.wired.com/wired/archive/8.09/kamen.html>, pp. 1-9.
"Low Flow Toilets," U.S. Environmental Protection Agency, Water Use Efficiency Program, as published as <http://www.epa.gov/OW-OWM.html/water-efficiency/toilets.htm> pp. 1-3.
"Motorized Vacuum Refuse Collection System," as published at <http://nett21.gec.jp/JSIM_DATA_/WASTE/WASTE_1/html/Doc_350.html>, pp. 1-3.
Ostrowski, J., "Ecotecture—The Language for Ecological Homes," Environmental Design+Construction, as published online at Environmental Design+Construction <http://www.edcmag.com/edc/cda/articleinformation/coverstory/bnpcoverstoryitem/0,,19439,00+en-uss_01dbc.html>, posted Jan. 25, 2001, pp. 1-12.
"Phoenix Composting Toilet Sets New Standard," Environmental Building News, Jun. 1998, as published at <http:www.compostingtoilet.com/LITRACK/Articles/ebuild.htm> pp. 1-3.
Reddy, A., et al., "Chapter 8: Community Biogas Plants Supply Rural Energy and Water: The Pura Village Case Study," as published online at UNDP <http://www.undp.org/seed/energy/policy/ch_8.htm>, pp. 1-14.
"Refuse Capsuled Transportation System," as published at <http://nett21.gec.jp/CTT_DATA_/WASTE/WASTE_1/html/Waste-022.html>, pp. 1-2.
"Refuse Vaccum Sealed Conveyance System," as published at <http://nett21.gec.jp/CTT_DATA_/WASTE/WASTE_1/html/Waste-021.html>, pp. 1-2.
"Renewable Energy Technologies," as published at <http://www.rentec.ca/biogas_turnkey%20solutions.htm>, pp. 1-2.
"Renewable Energy Technologies Biogas Economics," as published at <http://www.rentec.ca/biogas_economics.htm>, pp. 1-2.
"Renewable Energy Technologies: Biogas FAQ," as published at <http://www.rentec.ca/FAQ.htm>, pp. 1-8.
"Robot for Working in Small-Diameter Piping," Toshiba, Feb. 21, 1997, as published at <http://www.toshiba.co.jp/about/press/1997_02/pr2101.htm>, pp. 1-2.
"Robot to clear garbage," The Hindu, Thursday, Jul. 5, 2001, as published at <http://www.hinduonnet.com/thehindu/2001/07/05/stories/14052187.htm>, pp. 1-2.
Roboter Info. http://www.roboter-info.de/englisch/einfuehrung.html.
"Robots," Siemens Webzien, as published at <http://w4.siemens.de/Ful/en?archiv/pof/heft2_02/artikel26/>, pp. 1-2.
"Saving Water," as published at <http://www.here4business.co.uk/blny/environment/water.asp>, pp. 1-2.
"ScienceDaily News Release: Pets May Be Major Cause of Water Pollution in Urban Areas," adapted from a news release issued by Vanderbilt University, as published at <http://www.sciencedaily.com/releases/1999/12/991206071651.html> pp. 1-2.
"ShinMaywa Vacuum Type Refuse Collecting and Transporting System 'TECHNOUUM'," as published at <http://nett21.gec.jp/JSIM_DATA_/WASTE/WASTE_1/html/Waste-011.html.22 , pp. 1-4.
"Simple Methods for the Treatment of Drinking Water," as published at <http://www.ces.iisc.ernet.in/energy/water/paper/drinkingwater/simplemethods/treatment.html>, pp. 1-5.
The Original OutBack Pack < http://www.outbackpack.com>.
"Waste Management System for High-rise Building (FUSWTON)," as published at <http://nett21.gec.jp/JSIM_DATA_/WASTE/WASTE_1/html/Doc_348.html>, pp. 1-4.
"Waste Pneumatic Transportation System," as published at <http://nett21.gec.jp/JSIM_DATA_/WASTE/WASTE_1/html/Waste-025.html>, pp. 1-2.
"Water for a Thirsty City," as published at <http://www.sheilaforcouncil.com/issues/water.htm>, pp. 1-2.
Waterless Urinals <http://www.brookwater.co.uk/Aridian-Water-Less_Urinals.htm>.
"WTE," as published at <http://www.wte.org/energy.html>, pp. 1-3.
U.S. Appl. No. 10/725,217, Nov. 18, 2005, Office Action.
U.S. Appl. No. 10/725,217, Mar. 30, 2006, Office Action.
U.S. Appl. No. 11/119,842, Feb. 11, 2008, Office Action.
U.S. Appl. No. 11/119,842, Jul. 14, 2008, Office Action.
U.S. Appl. No. 11/537,470, Jun. 23, 2008, Office Action.
U.S. Appl. No. 11/932,983, Jul. 20, 2011, Office Action.
U.S. Appl. No. 11/932,983, Feb. 3, 2012, Office Action.
U.S. Appl. No. 11/932,983, May 17, 2012, Notice of Allowance.
U.S. Appl. No. 11/932,983, Aug. 29, 2012, Issue Notification.
U.S. Appl. No. 13/353,031, Aug. 24, 2012, Office Action.
U.S. Appl. No. 13/353,031, Dec. 20, 2012, Office Action.
U.S. Appl. No. 13/353,031, Jul. 17, 2013, Office Action.
U.S. Appl. No. 13/353,031, Feb. 28, 2014, Notice of Allowance.
U.S. Appl. No. 13/353,031, Jun. 18, 2014, Issue Notification.

* cited by examiner

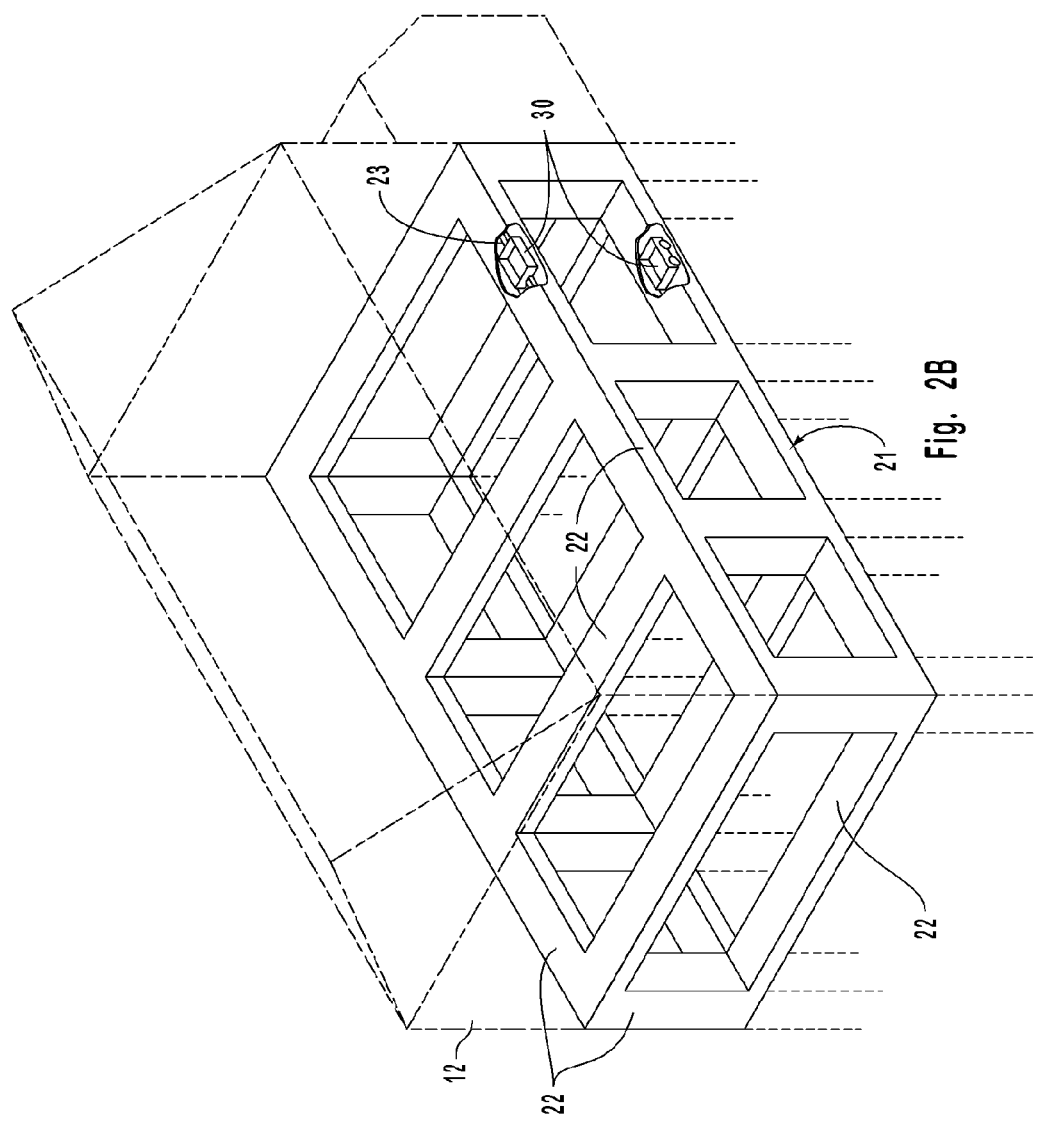

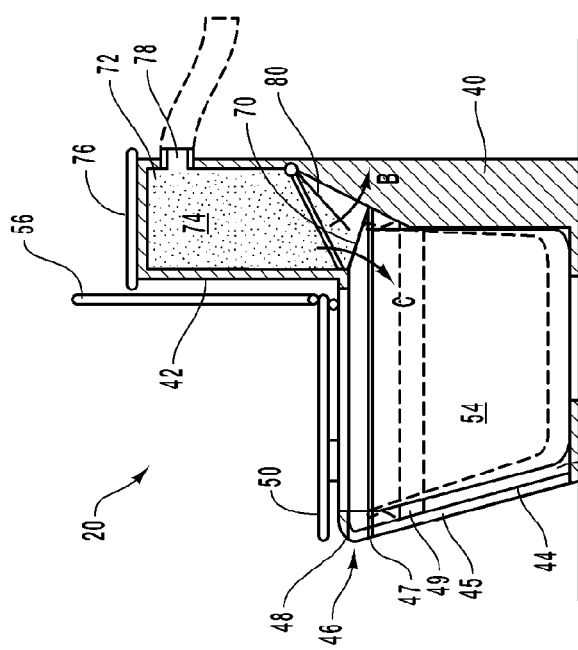
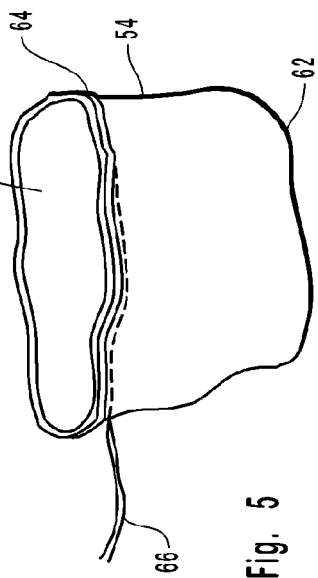
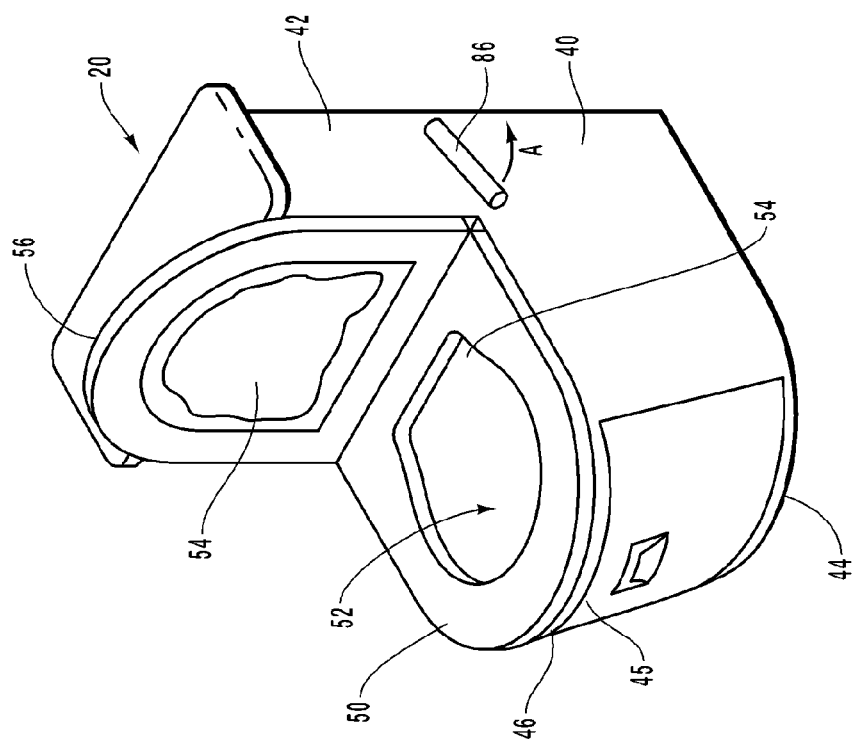
Fig. 4
Fig. 5
Fig. 3

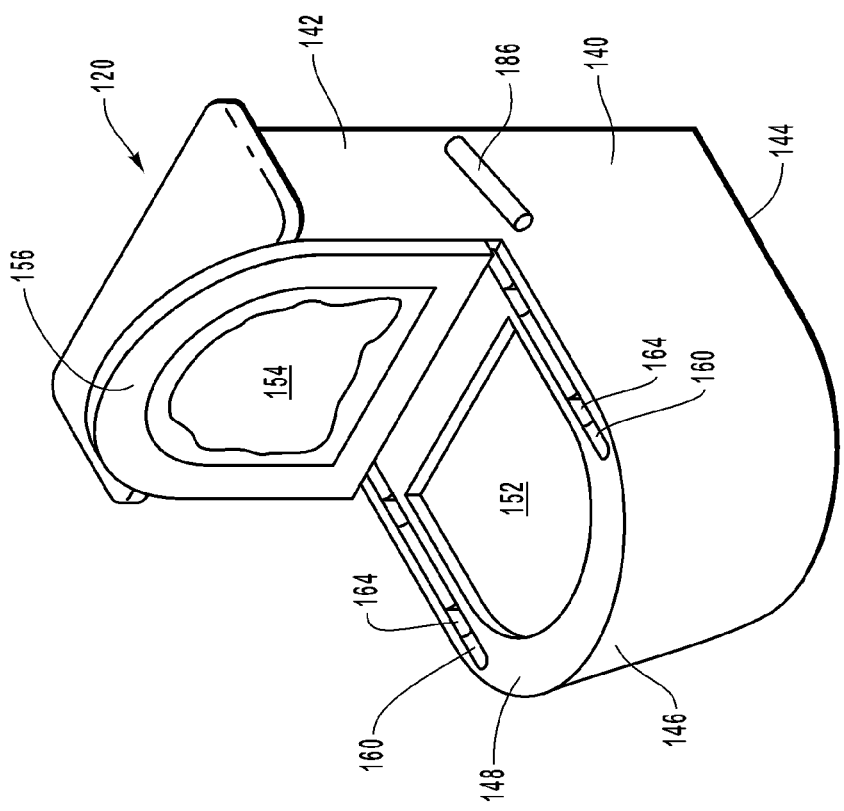

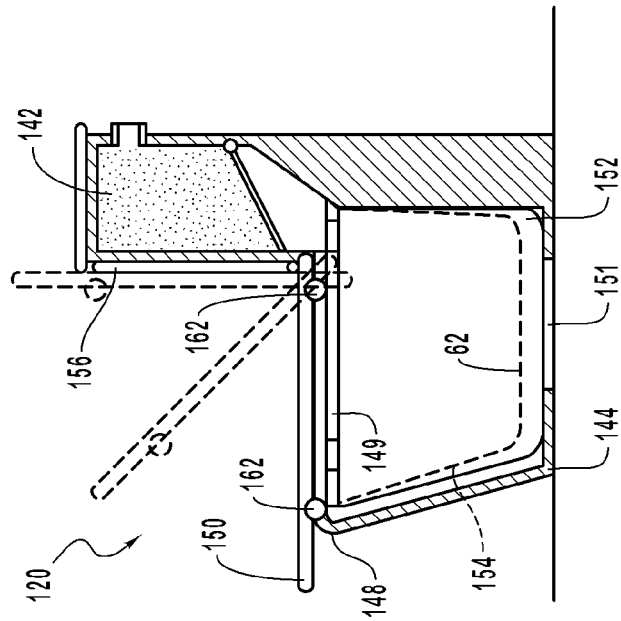
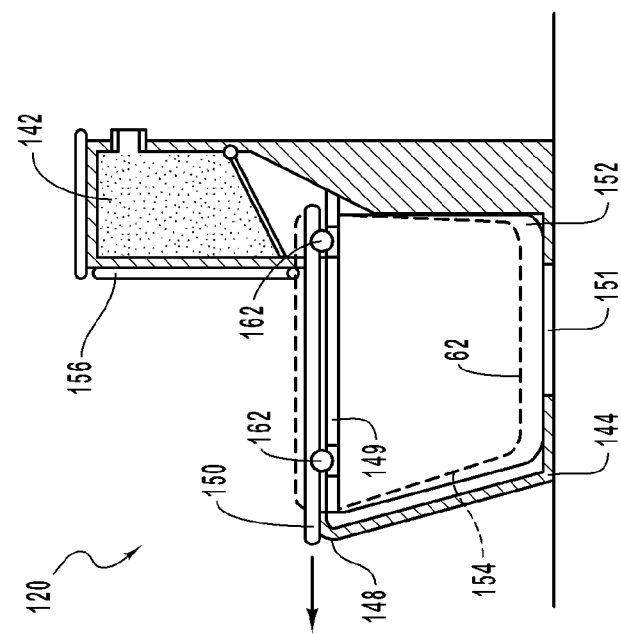

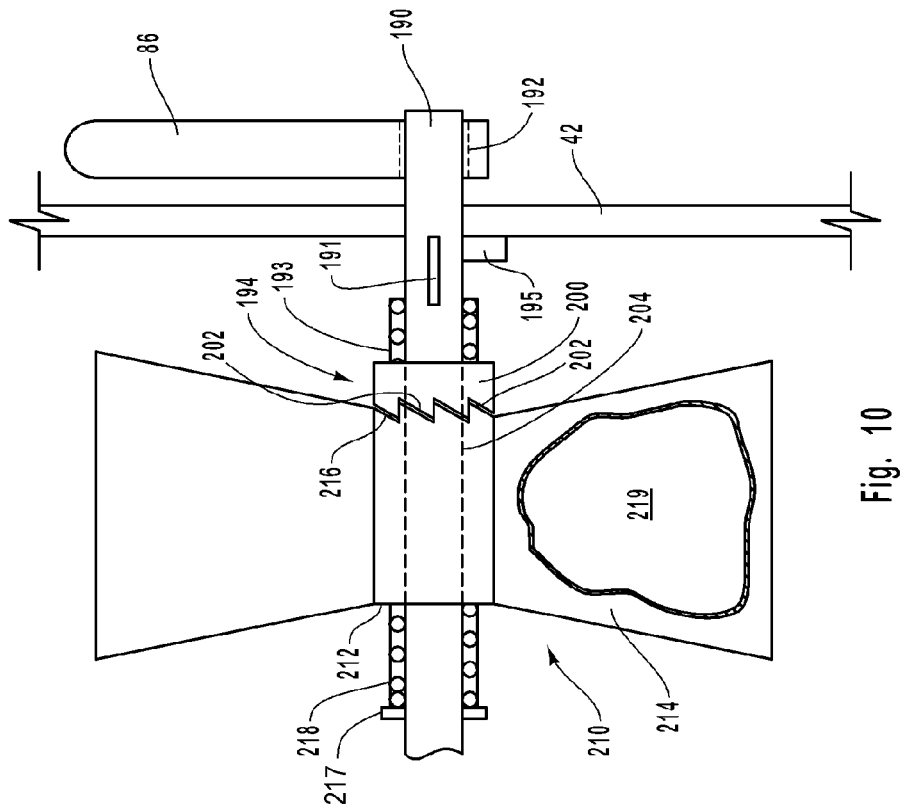
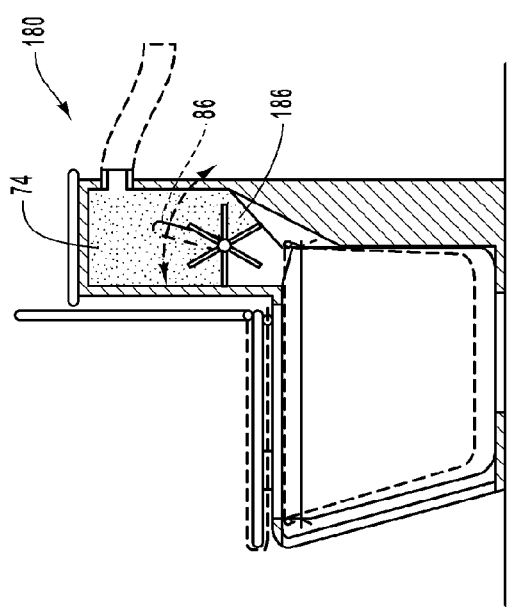
Fig. 10
Fig. 9

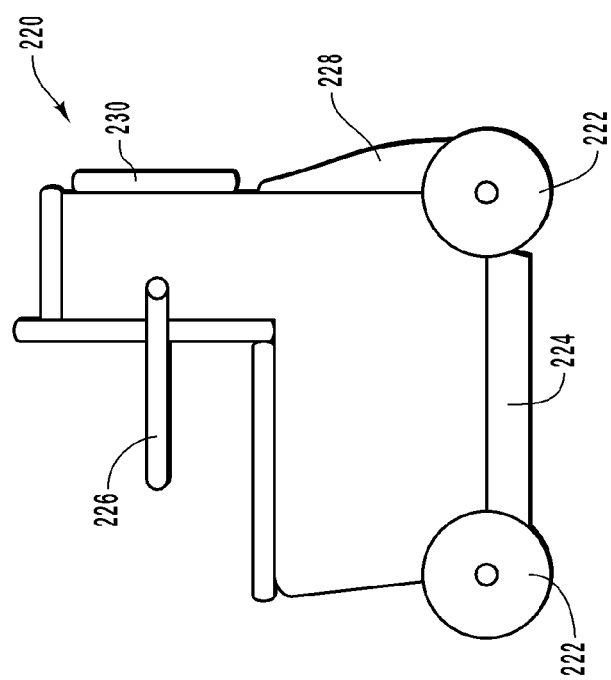

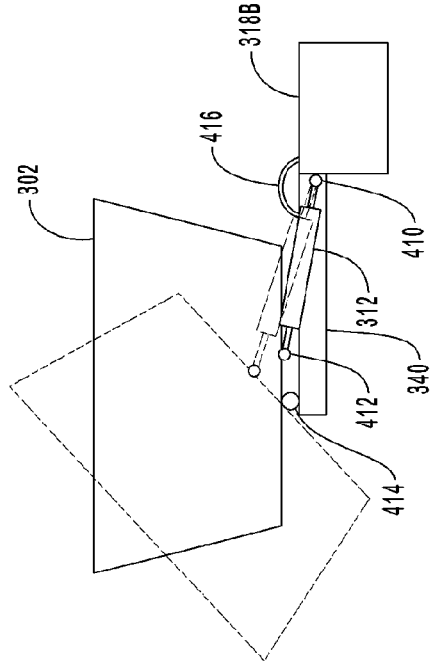
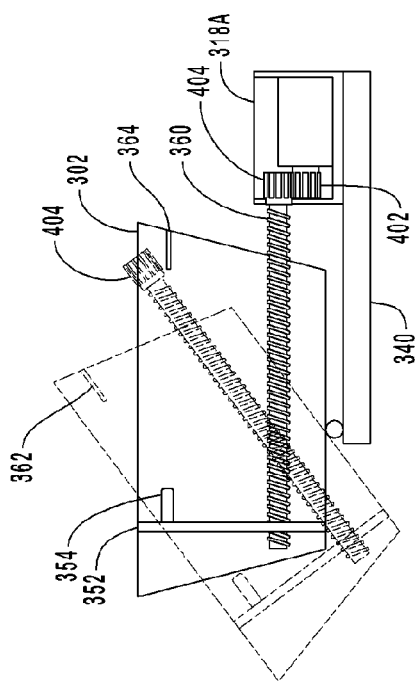
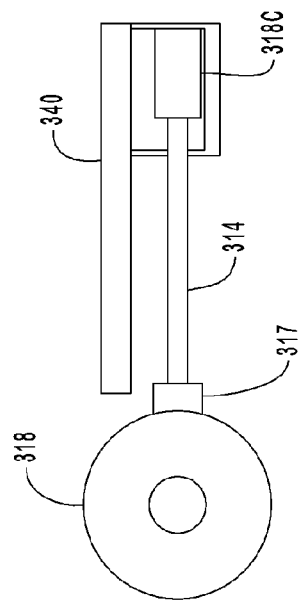

SYSTEMS AND METHODS FOR TRANSPORTING BIO-WASTE

RELATED APPLICATIONS

This is a continuation application of co-pending U.S. patent application Ser. No. 13/353,031, filed Jan. 18, 2012, entitled "Remote-Controlled Vehicle For Transporting Bio-Waste," which is a continuation of U.S. patent application Ser. No. 11/932,983, filed Oct. 31, 2007, entitled "Remote-Controlled Vehicle For Transporting Bio-Waste," now U.S. Pat. No. 8,266,739, which is a continuation-in-part of: (i) U.S. patent application Ser. No. 11/119,842, filed May 2, 2005, entitled "Train-Operated Biowaste Removal System," which is a continuation-in-part of U.S. patent application Ser. No. 10/725,217, filed Dec. 1, 2003, entitled "Methods, Systems, And Devices For Saving Natural Resources Usable in a Building Structure," and (ii) U.S. patent application Ser. No. 11/537,470, filed Sep. 29, 2006, entitled "Methods, Systems, And Devices For Saving Natural Resources Usable in a Building Structure," which is a continuation application of U.S. patent application Ser. No. 10/725,217, now abandoned. The disclosures of each of the above applications are hereby incorporated herein by this reference.

BACKGROUND

1. Technical Field

The present disclosure generally relates to methods, systems, and devices for saving natural resources. More specifically, the present disclosure generally relates to substituting mechanical and electromechanical devices and systems for waste disposal systems that traditionally use water as a carrier medium.

2. The Relevant Technology

In recent years there has been an attempt to protect and preserve natural resources, while accommodating changes in city, state, and country populations. The quantity of natural resources is limited, while the demand for such natural resources continues to increase at a dramatic rate. There is a tension between the need to use natural resources for, say, eating, drink, heating, etc, while protecting or controlling the quantity of resources used. Illustratively, there is a tension between the need to develop land for an increasing population base and protecting natural forests and wet lands. Further, there is a tension between generating new fuel sources and adversely affecting pristine land.

In addition to protecting the natural resources associated with land and fuel sources, such as wood, oil, gas, and coal, there is a need to preserve water resources. With an exploding world population, available water resources are being overextended. Existing technologies are incapable of reducing the quantity of water used for every day living. Waste of consumable water occurs because of antiquated water systems that lose water or use water in an efficient manner. For instance, many existing water supply lines leak allowing significant quantities of culinary water to seep into the ground surrounding the water line.

In addition to losing and wasting water through antiquated supply infrastructure, modern toilets inefficiently use water. Currently, water is the primary carrier for removing bio-waste. Toilets remove human waste, while use of sinks, drains, and faucets facilitates removal of animal waste. For many years, a significant quantity of water was wasted through the use of inefficient toilets that used excessive quantities of water to "flush" bio-waste material using a toilet. In recent years, and by resulting Government action, there has been a reduction in the amount of water used to flush bio-waste material. Although this preserves some natural resources, still more must be done to alleviate the strain exerted on existing water supplies.

In addition to the problems with preserving water resources, other problems arise with providing electricity to homes, factories, etc. With the escalating cost of natural resources, such as gas and oil, the cost for treating wastewater continues to increase. Further, the increasing demand for electricity drives the cost for building and maintaining the electricity infrastructure upward. When available electricity falls below the needed supply, blackouts become the norm. These blackouts cost the nation significant amounts of money and productive time.

Needed are methods, systems, and devices that alleviate the need for water as the primary source for removing bio-waste, and by so doing aid with preserving natural resources. Additionally, needed are methods, systems, and devices that can facilitate conversion of bio-waste material into an energy resource.

BRIEF SUMMARY

The present disclosure provides methods, systems, and devices that alleviate the need for water as the primary carrier for removing bio-waste, and by so doing aid with preserving natural resources. Additionally, the present disclosure provides methods, systems, and devices that can facilitate conversion of bio-waste material into an energy resource.

In one embodiment of the present disclosure, methods, systems, and devices are provided that save natural resources through substituting mechanical and electrical-mechanical devices and systems for water as a carrier medium for removing bio-waste materials. Through using a network of collection receptacles associated with a physical structure, such as a home, office, warehouse, or other physical structure. The collection receptacles receive bio-waste material, while removal of the bio-waste material occurs through a transport network. This transport network includes various tunnels, chambers, etc. Through the network moves mechanical or electro-mechanical devices that automatically collect and package bio-waste material deposited in the collection receptacle. In particular, the disclosure discloses a remote-controlled vehicle that moves within the network as well as outside the network, collecting and compacting bio-waste material, transporting it to various possible locations: local storage, a local recycle facility, a remote recycle facility, to machines (on-site or off-site) that can turn blocks or cubes of compacted bio-waste material into energy, or to other desired locations on-site or off-site, such as a waste treatment plant.

According to another aspect of the present disclosure, provided are methods, systems, and devices that utilize collected and packaged bio-waste material as a fuel source. Homes, factories, or other building structures can include a dedicated recycle system that burns the bio-waste material, converting the bio-waste material into electricity usable by the home, factory, or other building structure. Alternatively, as set forth, collected or packaged bio-waste material can be transported to one or more centrally located recycle facilitates that burn the bio-waste material, again creating electricity.

These and other objects and features of the present disclosure will become more fully apparent from the following description and appended claims, or can be learned by the practice of the disclosure as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 2B illustrates a schematic perspective representation of an exemplary local network for the exemplary building structure of FIG. 2A according to one configuration of the present disclosure.

FIG. 3 illustrates a perspective view of an exemplary collection receptacle of the exemplary building structure of the exemplary system of FIG. 1A according to one configuration of the present disclosure.

FIG. 4 illustrates a cross-sectional view of an exemplary collection receptacle of the exemplary building structure of the exemplary system of FIG. 1A according to one configuration of the present disclosure.

FIG. 5 illustrates a perspective view of an exemplary liner for the exemplary collection receptacles of FIGS. 3 and 4 according to one configuration of the present disclosure.

FIG. 6 illustrates a perspective view of another exemplary collection receptacle of the exemplary building structure of the exemplary system of FIG. 1A according to one configuration of the present disclosure.

FIG. 7 illustrates a cross-sectional view of the exemplary collection receptacle illustrated in FIG. 6 according to one configuration of the present disclosure.

FIG. 8 illustrates a cross-sectional view of the exemplary collection receptacle illustrated in FIG. 6 according to one configuration of the present disclosure.

FIG. 9 illustrates a side view of another exemplary collection receptacle of the exemplary building structure of the exemplary system of FIG. 1A according to one configuration of the present disclosure.

FIG. 10 illustrates a schematic partial cross-sectional side view representation of an exemplary building structure of the exemplary system of FIG. 1A, with associated collection receptacles, carts, network, and local storage according to one configuration of the present disclosure.

FIG. 11 illustrates a side view of an exemplary cart of the exemplary building structure of the exemplary system of FIG. 1A according to one configuration of the present disclosure.

FIGS. 16A-C illustrate partial side views of components of the vehicle of FIG. 14 while performing an unloading operation.

DETAILED DESCRIPTION OF THE EXEMPLARY EMBODIMENTS

The present disclosure overcomes many of the problems associated with existing bio-waste systems. Specifically, the present disclosure utilizes a technology that improves health and sanitation for humans and animals, by reducing handling of bio-waste material and hence reducing possible contamination, creation, and harboring of disease-producing bacteria, germs, and viruses, produced by mixing water and waste material. Further, the present disclosure reduces the expense for treatment of such waste water and reduces the cost and maintenance for upgrading the existing networks that transport waste water to various treatment facilities.

The present disclosure described herein relates to systems, methods, and devices associated with using machines as the carrier of bio-waste or bio-solids in dwellings, homes, houses, buildings, or any other structure that bio-waste or bio-solids are created and removal of deposits is required for sanitation. In this manner, the systems, methods, and devices replace water as the carrier of bio-waste, thereby saving natural water resources. Further, the present disclosure relates to utilizing the collected bio-waste material as a fuel source to supplement and, in some cases, substitute for existing natural resources, such as wood, coal, oil, and gas. By so doing, the present disclosure provides additional resources rather than eliminating or reducing the available natural resources.

Figure 1A:
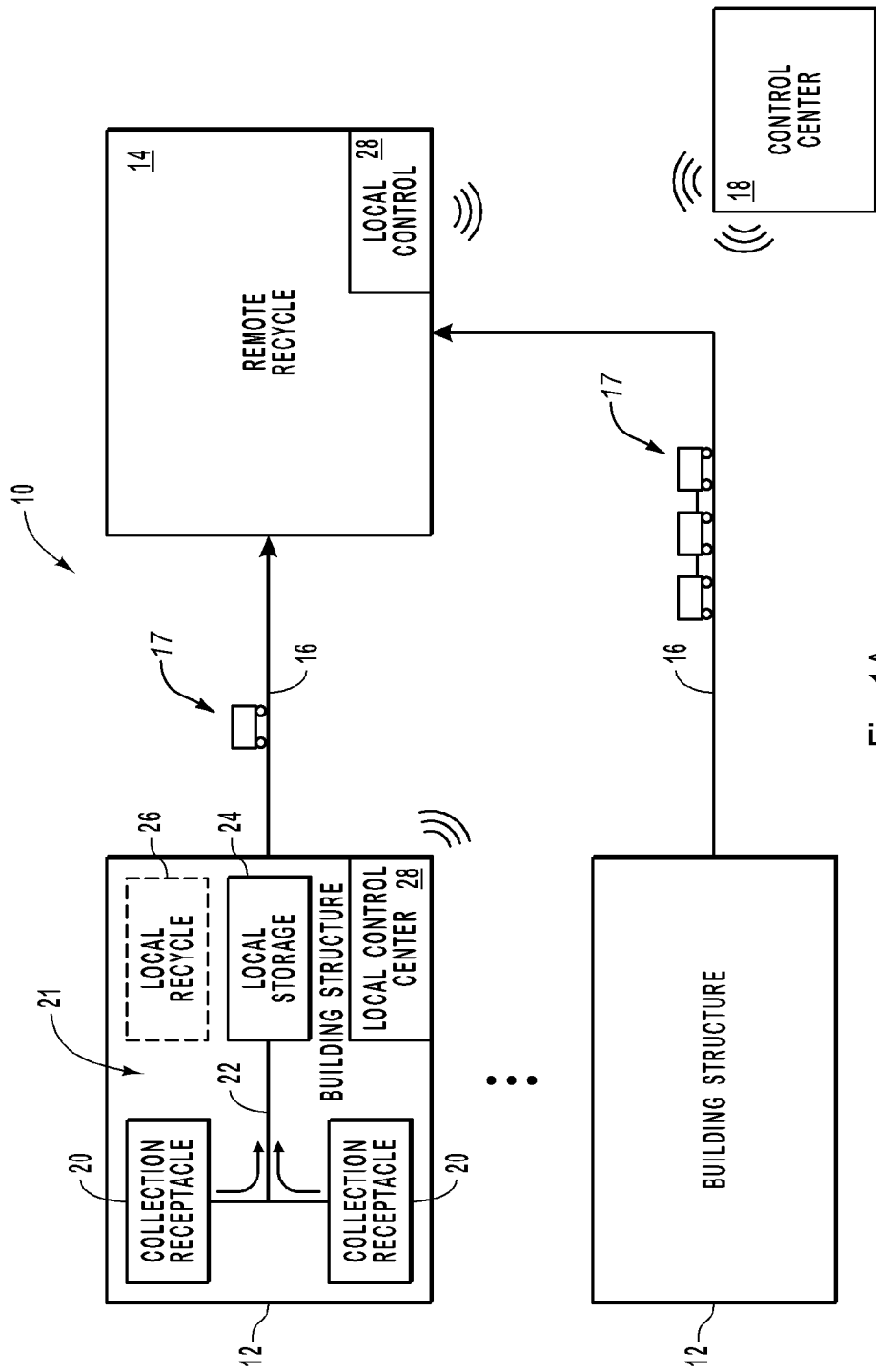
FIG. 1A illustrates a schematic representation of an exemplary system of the present disclosure.
Figure 1B:
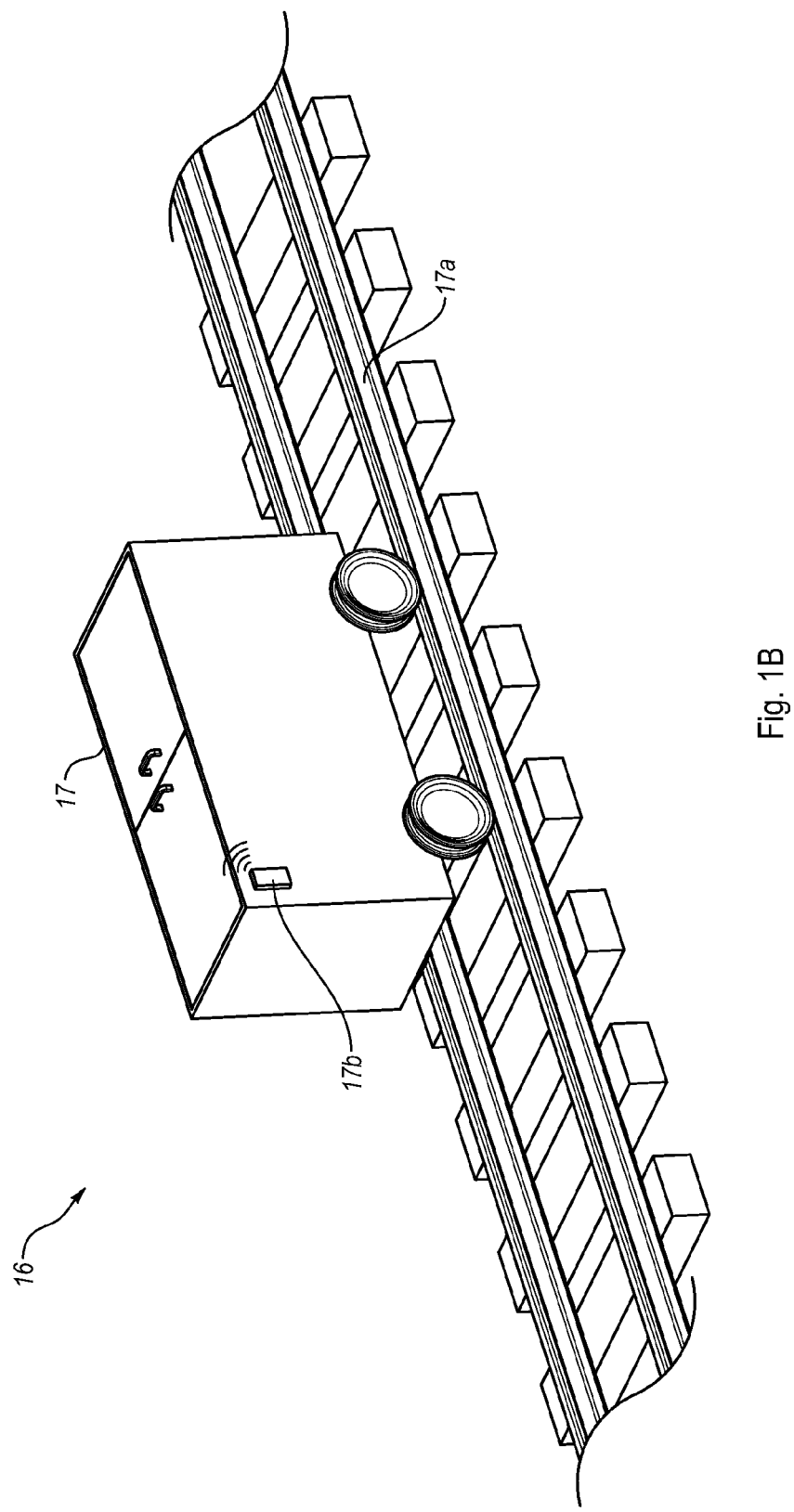
FIG. 1B illustrates a perspective view of an exemplary transportation network of the exemplary system of FIG. 1A according to one configuration of the present disclosure.

Referring now to FIG. 1A, depicted is a schematic representation of an exemplary system of the present disclosure designated by reference numeral 10. The system 10 includes one or more building structures 12 that are remote from a remote recycling facility 14 where collected bio-waste is converted into electrical power, such as by burning or other manner of obtaining energy from the collected bio-waste. The use of the term "recycle facility" includes other facilities such as, but not limited to, treatment plants, bio-gas plants, or other facilities that can use the collected bio-waste.

Building structures 12 communicate with the remote recycling facility 14 by way of a transportation network 16. This transportation network 16 accommodates vehicles, trains, or other conveyances, schematically represented and identified in FIG. 1A with reference numeral 17, capable of carrying bio-waste from building structures 12 to recycling facility 14. For instance, FIG. 1A illustrates that transportation network 16 can include existing or customized roads, rails, tunnels, waterways, combination thereof (identified with reference numeral 17a), or other structures that facilitate collection and delivery of bio-waste material via vehicles, trains, or other conveyances 17.

Optionally, system 10 can include a control center 18 in signal communication with building structures 12, recycle facility 14, and/or such vehicles 17 moving along transportation network 16. This control center 18 delivers signals carried by electromagnetic waves, such as microwaves or radio waves, to building structures 12, recycle facility 14, and/or the vehicles 17 using transportation network 16 to control the collection, packaging, and/or recycling of bio-waste material. Analysis of signals received from building structures 12, recycle facility 14, and/or the vehicles 17 using transportation network 16 enables computers, including hardware and/or software modules and components, and/or individuals at control center 18 to manage bio-waste collection, transportation, and recycling. One skilled in the art will appreciate that each building structure 12, recycle facility 14, and/or vehicle 17 using transportation network 16 can include appropriate transmitter(s) and/or receiver(s) capable of sending and/or receiving the desired signals. Further, each building structure 12, recycle facility 14, and/or vehicle 17 using transportation network 16 can include global positioning technology for use in pinpointing the location of the same.

The individuals using building structures 12, whether it is a factory, home, office, etc., generate quantities of bio-waste, such as from cooking, cleaning, urinating, defecating, or other manner of creating bio-waste. To reduce the quantity of water used to remove this bio-waste from building structures 12, system 10 uses waterless collection devices to collect and package bio-waste instead of water.

Each building structure 12 includes one or more waterless collection receptacles 20, a network 21 for transporting the bio-waste collected from collection receptacles 20, and a local storage 24 for bio-waste collected and packaged at the particular building structure. Optionally, each building structure 12 can include a local recycle facility 26 that can use the bio-waste for powering the particular building structure generating the collected bio-waste. For instance, local recycle facility 26 can be a smaller version of remote recycle facility 14 that burns the bio-waste to create electrical power for the building structure generating the bio-waste.

Additionally, each building structure 12 can include a local control center 28 that governs or controls the collection of bio-waste at the specific building structure. This local control center 28 can include hardware and software modules and components to control movement of the collection devices and motorized carts or vehicles to collect and package bio-waste instead of water. The local control center 28 manages operation of local recycle 26 and can make requests to control center 18 for pick-up of collected bio-waste. These communications and requests can be made using any type of telecommunication network, including wireless, microwave, radio frequency, fiber optic, combinations thereof, or other telecommunication technology that enables transmitting and receiving, collectively transceiving, of signals.

The transportation network 16 associated with system 10 is used to carry the collected and packaged bio-waste to remote recycle facility 14. Vehicles 17 can periodically visit each building structure 12 and gather the collected and packaged bio-waste. These vehicles 17 can transport the bio-waste to remote recycle facility 14 where it is converted to electrical energy, such as by burning. As illustrated in FIG. 1A, this network 16 can include roads, rails, tunnels, or other transport infrastructure 17a to carry the bio-waste. Each vehicle 17 can include sensors and/or receivers 17b to intercept signals from control center 18 that controls the collection of bio-waste material. These vehicles can be automatically controlled by control center 18 or manually controlled by the operator of the vehicle upon receiving instructions from control center 18. Examples of remote-controlled vehicles according to the present disclosure are disclosed and described in more detail below.

Figure 2A:
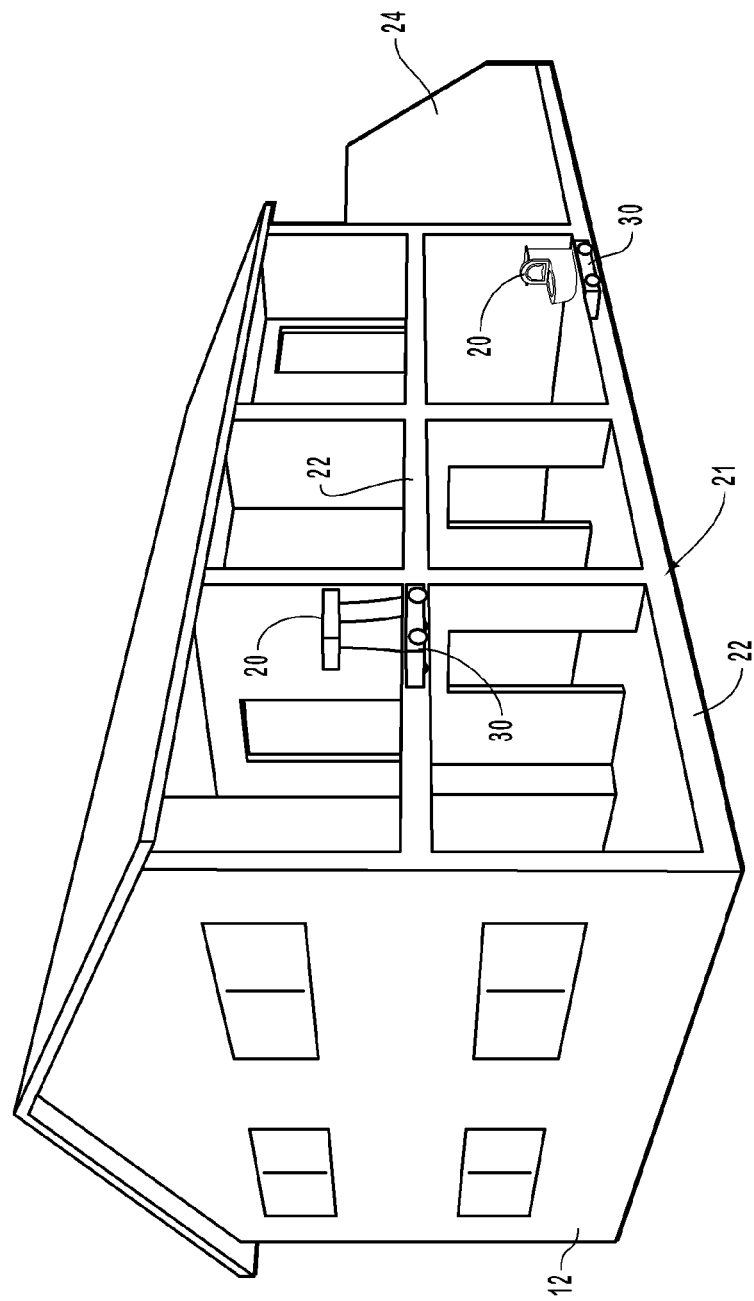
FIG. 2A illustrates a schematic partial cross-sectional perspective representation of an exemplary building structure of the exemplary system of FIG. 1A, with associated collection receptacles, carts, network, and local storage according to one configuration of the present disclosure.

With reference to FIG. 2A, depicted is a schematic representation of an exemplary building structure 12. To reduce the quantity of water used to remove bio-waste from building structure 12, building structure 12 includes one or more collection receptacles 20 that receive the bio-waste. One or more electromechanical carts 30 collect bio-waste from these collection receptacles 20. This is in contrast to traditional or existing buildings where flowing water carries the bio-waste.

Carts 30 move within a local network 21 within building structure 12. The local network 21 includes one or more shafts, tunnels, channels, chutes, pipes, or tubes, termed herein individually a "transport member" 22 and collectively "transport members" 22. These transport members 22 criss-cross the interior of building structure 12 and provide a path for carts 30 to collect bio-waste, and following packaging of the bio-waste material into fuel blocks, transport the bio-waste to a local storage 24 for short-term or long-term storage.

For illustrative purposes, FIG. 2B depicts the local network 21 of FIG. 2A, which comprises the transport members 22, while the schematic representation of the building structure 12 of FIG. 2A is shown in phantom lines. As set forth above, transport member 22 may be shafts, tunnels, channels, chutes, pipes, or tubes 22. Although not shown in FIG. 2A, FIG. 2B shows transport members 22 extending down into a basement of the building structure 12. In addition, FIG. 2B shows a cart 30 as it would move within a transport member 22, and also shows another cart 30 without wheels as it would move on a transit system 23 that can be stationary tracks, rails, cables, chains, belts, pneumatic systems, hydraulic systems or other structures that serve as a transit system 23.

Referring now to FIGS. 3 and 4, illustrated is an exemplary collection receptacle 20 according to one embodiment of the present disclosure. This collection receptacle 20 collects bio-waste directly from the occupants of building structure 12, such as when an occupant urinates or defecates. Other collection receptacles can collect bio-waste indirectly or directly from occupants of building structure 12. For instance, other collection receptacles can collect wastewater or other bio-waste from waste disposal sinks or other similar structures within building structures 12.

Collection receptacle 20 can have the form of a chair or stool similar to existing toilets. However, collection receptacle 20 eliminates the need for water as a carrier of the bio-waste collected through collection receptacle 20. Collection receptacle 20 has a main body 40 with a reservoir 42 mounted thereto. The main body 40 has a lower portion 44 adapted for attachment to a floor or generally horizontal surface upon which collection receptacle 20 is to rest, such as with the building structure 12 (FIG. 2B).

As shown in FIG. 4, an upper portion 46 of main body 40 includes a lip 48 that supports a seat 50. Disposed between upper portion 46 and lower portion 44 is a drawer 45 that is slidably received within a chamber 52 that receives the bio-waste material. The drawer 45 includes a lip 47 that cooperates with a liner 54 dispensed to a user from a liner dispenser 56, as will be discussed in more detail hereinafter. The drawer 45 is mounted on two sliders 49, only one being illustrated in FIG. 4, which is in turn mounted to main body 40. Each slider 49 can be any rail-type slider that allows movement of one structure relative to another. For instance, slider 49 can include a rail mounted to main body 40 that cooperates with a rail mounted to drawer 45, one or both of the rails including bearings, rollers, or wheels to reduce friction between the rails and enable movement one to another. One skilled in the art can identify various other configurations or mechanisms to facilitate movement of drawer 45 relative to main body 40.

The liner 54, as shown in FIG. 5, has an open end 60 that cooperates with lip 47 of collection receptacle, while a closed end 62 locates within chamber 52. A user can remove liner 54 from liner dispenser 56 and mount the same to lip 47 of drawer 45. This liner 54 releasably contacts lip 47 by way of an elasticated portion 64 that releasably surrounds a portion of lip 47 of drawer 45. In another configuration, liner 54 includes, optionally in addition to elasticated portion 64, a layer of releasable adhesive that attaches to lip 47 of drawer 45 so that a portion of liner 54 extends into chamber 52. In still another configuration, liner 54 releasably contacts lip 47 of drawer 45 through the forces of friction or static electricity, optionally in addition to elasticated portion 64 coupling liner 54 to lip 47 of drawer 45. In still another configuration, liner 54 includes an elastic snap ring that cooperates with lip 47 of drawer 45. In still another configuration, liner 54 includes press-on seal plastic portions that couple liner 54 to lip 47 of drawer 45. In still another configuration, liner 54 and/or lip 47 of drawer 45 include one or more adhesive spots, tabs, or tapes that couple liner 54 to lip 47 of drawer 45.

Liner 54 securely collects any bio-waste material deposited therein and prevents a portion of the bio-waste material escaping from liner 54. To aid with this, liner 54 includes drawstring 66 close to open end 60 that facilitates closing of liner 54. A user manually operates drawstring 66 to close open end 60 of liner 54. Manual operation of drawstring 66 occurs, either directly or indirectly, by way of intervening levers, gears, linkages, mechanical or electromechanical components, combination thereof, or other manners by which movement of a user initiates movement of drawstring 66. Optionally, moving drawstring 66 to close open end 60 releases the contact between liner 54 and lip 47 of drawer 45, thereby enabling liner 54 to drop into an awaiting cart or storage receptacle from which the cart removes the bio-waste.

Generally, liner 54 can be fabricated from synthetic materials, natural materials, combinations of synthetic and natural materials. More specifically, liner 54 can be made from paper, plant material, wood, composites, cloth, plastics, polymers, or other materials. Additionally, liner 54 can be coated with or receive an absorbent material that causes liquids deposited into liner 54 to become a gel. For instance, colloids, hygroscopic chemicals, bio-polymers, cationic dry polymer, combinations thereof, or other materials that can absorb a liquid. The liner 54, alone or in combination with an absorbent material deposited within liner 54, absorbs gases and neutralizes odors of the collected bio-waste material. This can be achieved by an absorbent material that congeals and deodorizes liquids, such as but not limited to, bodily fluids.

Returning to FIG. 4, reservoir 42 includes a hole 70 that cooperates with chamber 52. An interior chamber 72 of reservoir 42 communicates with hole 70. This interior chamber 72 holds an absorbent material 74 that can be deposited into liner 54 prior to collection of bio-waste material. This absorbent material 74 can be deposited within interior chamber 72 through a top of reservoir 42, such as by removing a lid 76 thereof. Alternatively, absorbent material 74 can flow into interior chamber 72 through a fill hole 78 and associated piping, illustrated by dotted lines, such as blown into interior chamber 72 using appropriated fans, fiber moving equipment, etc.

The absorbent material 74 can be any material that will absorb fluids deposited within liner 54. These materials can include, but are not limited to, fibrous materials that have been shredded, ground, chopped, and/or pulped into small pieces before being blown into interior chamber 72. Exemplary materials include, but are not limited to, paper, plant materials, plastic, composite wood, composite plastics, clay, sand, shells, earth, stone, cloth, bee wax, animal bi-products, solidifying chemicals (gels), odor neutralizers, gas modifiers, deodorants or air fresheners, natural and chemical preservatives, modified non-combustible composite materials that have a reduced potential of spontaneous combustion, recycled cellulose fibers, organic plant waste, grass clippings, leaves, weeds, seeds, wood, bark, shavings, needles, chips, sawdust, ground corncobs, shredded stover, stocks, and cornstarch, straw, flax, oat, wheat, chopped hay, shells, husks of coca, peanut, cottonseed, oats, chia seeds, combinations thereof, or other material that can absorb fluids associated with the collected bio-waste.

This absorbent material 74 can be directed into hole 70 through the forces of gravity and use of a guide member 80. Alternatively, feed screws, rams, plungers, spinning spindle wheels, or other mechanical or electro-mechanical devices can be used to direct a quantity of absorbent material 74 into liner 54. Lever 86 (FIG. 3) connects to guide member 80 through a linkage (not shown) so that moving lever 86 (FIG. 3) in the direction of arrow A moves guide member 80 in the direction of arrow B to allow a quantity of absorbent material 74 to pass into liner 54, as illustrated by arrow C, prior to or following depositing of the bio-waste into liner 54. In this manner, the user can deposit any quantity of absorbent material into liner 54. By moving lever 86 in the opposite direction, guide member 80 moves to prevent passage of absorbent material 74 into liner 54.

In addition to the configuration described herein, one skilled in the art will appreciate that various other manners are possible by which liner 54 locates within chamber 52 and cooperates with lip 47, or some other portion of main body 40. Similarly, there can be various other mechanisms to deposit absorbent material 74 within liner 54.

With reference to FIGS. 6-8, illustrated is another exemplary configuration of a collection receptacle, identified by reference numeral 120. This collection receptacle 120 collects bio-waste directly from the occupants of building structure 12 (FIG. 1A), such as when an occupant urinates or defecates, in a similar manner to collection receptacle 20. The discussion of collection receptacle 20 applies to the following discussion with respect to collection receptacle 120.

With reference to FIG. 6, collection receptacle 120 has a main body 140 with a reservoir 142 mounted thereto. The main body 140 has a lower portion 144 adapted for attachment to a floor or generally horizontal surface upon which collection receptacle 120 is to rest. An upper portion 146 of main body 140 includes a lip 148 that supports a seat 150 that is omitted from FIG. 6 to aid with explanation, but shown in FIGS. 7 and 8. Extending from an opening 149 in upper portion 146 to an opening 151 in lower portion 144 is a chamber 152 that receives the bio-waste material. Additionally, chamber 152 receives a liner 154 from a liner dispenser 156 (FIG. 6). This liner 154 cooperates with seat 150 and interior chamber 152 and provides a container for bio-waste material.

Formed in lip 148 or upper portion 146 are grooves 160. Grooves 160 receive a portion of seat 150 (FIG. 7) to enable seat 150 to move relative to reservoir 142. More specifically, seat 150 (FIG. 7) includes a number of rollers 162 that slide along groove 160. Moving seat 150 relative to reservoir 142 allows a user to position the opening in seat 150 below hole 70 to receive absorbent material 74. The grooves 160 can include recesses 164 within which locate rollers 162 when seat 150 is in the desired location beneath reservoir 142. The rollers 162 also provide a pivot point about which seat 150 can pivot to allow seat 150 to receive liner 154 from liner dispenser 156, as shown in FIG. 8. The seat 150 pivots about the rearmost roller 162 to allow seat 150 to contact liner 154. With liner 154 having one or more adhesive tabs or an elasticated portion, pivoting seat 150 about an axis of roller 162 results in a top, sides, and/or bottom of seat 150 into contact with liner 154. The adhesive tabs or elasticated portion remains in contact with seat 150 as a user pivots seat 150 toward lip 148 or main body 140 so that liner 154 extends into chamber 152.

It will be understood by those skilled in the art in light of the teaching contained herein, that the seat can move relative to the reservoir using various other manners. For instance, rollers can be formed in upper portion 146 or lip 148, with the grooves and recesses being formed in the seat. In other configurations, biased members, such as springs or other biased structures, can aid with moving the seat relative to the reservoir.

As mentioned above, chamber 152 receives liner 154 from liner dispenser 156 mounted to main body 140, reservoir 142, or some other structure in close proximity to the location of collection receptacle 120. The liner 154 can have a similar configuration to that of liner 54, as illustrated in FIG. 5. With continued reference to FIG. 7, an open end of the liner 54 cooperates with seat 150 or main body 140 of collection receptacle, while closed end 62 locates within chamber 152. Instead of coupling liner 154 to seat 150 as described above, a user can remove liner 154 from liner dispenser 156 and mount the same to seat 150. In still another configuration, liner 154 releasably contacts seat 150 or main body 140 through the forces of friction or static electricity, optionally in addition to elasticated portion 64 (FIG. 5) coupling liner 154 to seat 150 when seat 150 is pivoted toward liner dispenser 156. In still another configuration, liner 154 includes an elastic snap ring that cooperates with seat 150. In still another configuration, liner 154 includes press-on seal plastic portions that couple liner 154 to seat 150. In still another configuration, liner 154 and/or seat 150 include one or more adhesive spots, tabs, or tapes that couple liner 154 to seat 150.

In addition to the configuration described herein, one skilled in the art will appreciate that various other manners by which liner 154 locates within chamber 152 and cooperates with seat 150 or main body 140. For instance, in another configuration, liner dispenser 156 moves manually or automatically toward seat 150 or main body 140 to deposit liner 154. The liner dispenser 156 pivots relative to a portion of main body 140 and/or reservoir 142 so that moving liner dispenser 156 toward seat 150 or main body 140 releases liner 154. Movement of liner dispenser 156 relative to reservoir 142 or seat 150 relative to reservoir 142 can occur through any of a number of mechanical or electro-mechanical devices, such as motors, gears, pneumatics, hydraulics, or other manners known to one skilled in the art, and sensor that sense the motion of an individual.

In another configuration, collection receptacle 20 or collection receptacle 120 can deliver a predetermined quantity of absorbent material 74. With reference to FIG. 9, a collection receptacle 180 can have a similar configuration to collection receptacle 20 or 120. Instead of including guide member 80 (FIG. 3) that moves under the influence of lever 86 (FIG. 3), collection receptacle 180 includes a delivery mechanism 186. The delivery mechanism 186 in cooperation with lever 86 deliver the predetermined quantity of absorbent material 74.

Referring now to FIG. 10, delivery mechanism 186 includes a shaft 190 mounted to lever 86 and supported by reservoir 42. The shaft 190 has an elongate configuration and cooperates with lever 86 such that movement of lever 86 causes shaft 190 to rotate. To achieve this engagement, shaft 190 can have complementary configuration to a hole 192 of lever 86. For instance, shaft 190 can have a cylindrical configuration to cooperate with a cylindrical hole. Alternatively, shaft 190 can have a square or other polygonal configuration to cooperate with a square or other polygonal hole. In this later case, the configuration of shaft 190 and the hole aid with causing a driving engagement between shaft 190 and the hole.

To control the movement of shaft 190 and lever 86, shaft 190 includes a stop 191, while a spring 193 mounts to shaft 190 and connects to a portion of reservoir 42. Stop 191 prevent over-rotation of shaft 190 as it engages with a complementary stop 195 mounted to reservoir 42. The spring 193 returns lever 86 to an initial starting position following movement of lever 86 until stops 191 and 195 engage, resulting in the release a quantity of absorbent material 74. The spring 193 can also limit movement of lever 86 during use of collection receptacle 120 by providing a resistance force to over rotation of lever 86. Although spring 193 and stops 191 and 195 are one manner of controlling the movement of lever 86, one skilled in the art can identify various other manners.

Fixed to shaft 190 is a toothed member 194. The toothed member 194 has a body 200 with a plurality of teeth 202 extending therefrom. A hole 204 passes through body 200 and accommodates shaft 190. Hole 204 can have a similar configuration to the hole receiving the shaft 190, such that rotation of shaft 190 under the influence of lever 86 causes rotation of toothed member 194.

Cooperating with toothed member 194 and shaft 190 is a spindle assembly 210 that rotates about shaft 190 to move absorbent material 74 from interior chamber 72 to liner 54. Spindle assembly 210 includes a hub 212 from which extends one or more paddles 214 that have generally flexible or substantially rigid cup-type structures 219 that receive a quantity of absorbent material 74 (FIG. 9). As spindle assembly 210 rotates about shaft 190, paddles 214 deposit absorbent material 74 held by one or more of cup-type structures 219 into liner 54 (FIG. 9). Alternatively, as spindle assembly 210 rotates about shaft 190, paddles 214 deposit absorbent material 74 held between one or more adjacent paddles 214 into liner 54 (FIG. 9).

To aid with moving spindle assembly 210 relative to shaft 190, a portion of hub 212 cooperates with the toothed member 194 under the influence of spring 218. In the exemplary configuration, the portion of hub 212 includes a plurality of teeth 216 that are complementary to teeth 202 of toothed member 194. These teeth 202 and 216 engage as spring 218 is constrained by stop 217 and hub 212. As spring 218 attempts to expand, spring 218 forces hub 212 toward toothed member 194 so that teeth 202 and 216 engage. This engagement allows toothed member 194 to force hub 212 to move when shaft 190 rotates in a first direction. When shaft 190 moves in a second direction opposite to the first direction teeth 202 slide over the ramped portion of teeth 216 without causing hub 212 to rotate. By so doing, toothed member 194 causes selective movement of hub 212 and spindle assembly 210.

The teeth 202 and 216 can have various other configurations known to one skilled in the art. Through varying the configuration of teeth 202 and 216, different quantities of absorbent material 74 can be deposited into liner 54 (FIG. 9). Teeth 202 and 216 can have lengths or spacing so that moving lever 86 until stops 191 and 195 engage causes one or more cup-type structures 219 to deposit absorbent material 74 into liner 54. For one defined movement of shaft 190 and lever 86, such as until stop 195 prevents further rotation of shaft 190, hub 212 rotates sufficiently to deposit absorbent material 74 (FIG. 9) from one or more cup-type structures 219 or from one or more regions disposed between adjacent paddles.

In still another configuration, the quantity of absorbent material 74 deposited into liner 54 can be controlled by a series of movable members (not shown) that slide relative one to another upon moving lever 86. A sub-chamber formed between the two movable members; an upper movable member that communicates with chamber 72 and a lower movable member that communicates with hole 70 and/or chamber 52, holds a predetermined quantity of absorbent material 74. Moving the lower movable member through moving lever 86 in a first direction releases absorbent material 74 disposed in the sub-chamber into liner 54, while closing the lower movable member and opening the upper movable member by movement of lever 86 in a second direction following movement of lever 86 in the first direction releases a quantity of absorbent material into the sub-chamber.

As described herein lever 86 can function to open and close the movable members. Optionally, moving lever 86 moves drawstring 66 to close liner 54. It will be appreciated, however, that one or more levers can be used to perform the described functions. Further, it will be understood that various linkages, gears, cams, biased members, springs, and other similar structures can be associated with the lever and movable member to facilitate the desired movement thereof. For instance, moving lever 86 in a first direction can open the lower movable member, while moving lever 86 in a second direction opposite to the first direction allows lower movable member to close, the upper movable member to open, and the drawstring to the drawn.

Reference is made herein to collection receptacle 20 being fixed, such as a toilet within a building structure. It is anticipated, however, that collection receptacle 20 can be movable. FIG. 11 illustrates an exemplary movable collection receptacle 220. This collection receptacle 220 is stored at a storage location, such as a closet or some other location of building structure 12. Upon receipt of signal from a user of building structure 12 requesting bio-waste collection, movable collection receptacle 220 moves from the storage location to the requesting user. This can be accomplished as control center 18 and/or local control center 28, in FIG. 1A, uses global positioning system (GPS) technology and/or combination of various sensors and hardware and software components and devices included in building structure 12 and/or movable collection receptacle 220 to deliver control signals that direct movement of receptacle 220. For instance, control center 18 (FIG. 1A) can receive a signal indicative of a request for collection receptacle 220; the control center 18 (FIG. 1A) subsequently delivering control signals to local control center 28 (FIG. 1A) or directly to movable collection receptacle 220 to initiate motion of collection receptacle 220 to the desired location. The GPS technology and/or various sensors and hardware and software components and devices can be used to track and control the movement of movable collection receptacle 220. Following bio-waste collection, movable collection receptacle 220 returns to the storage location to deposit the liner into collection cart 30 within local network 21 (FIG. 1A).

The movable collection receptacle 220 can include one or more wheels 222 that enable movement of the collection receptacle, a holding tank 224 that receives the liner and collected bio-waste, and one or more arms 226 that support the user of the collection receptacle. Further, movable collection receptacle 220 can include a motor 228, such as, but not limited to, an electric motor connected to one or more batteries or other energy cells, that is linked to the wheels through one or more transmissions, linkages, gears, or the like known to those skill in the art. The motor moves wheels 222 under the direction of control components, indicated by reference number 230. The control components 230 include, but are not limited to, various sensors, computers, and other hardware and software components and modules, which detect electromagnetic wave signals delivered to collection receptacle 220, sense the operation of collection receptacle 220, and control the movement of collection receptacle 220 within building structure 12. This enables collection receptacle 220 to be programmed to move to a desired room or location of building structure 12 (FIG. 1A) upon receiving a signal from an individual within building structure 12 (FIG. 1A).

Figure 12:
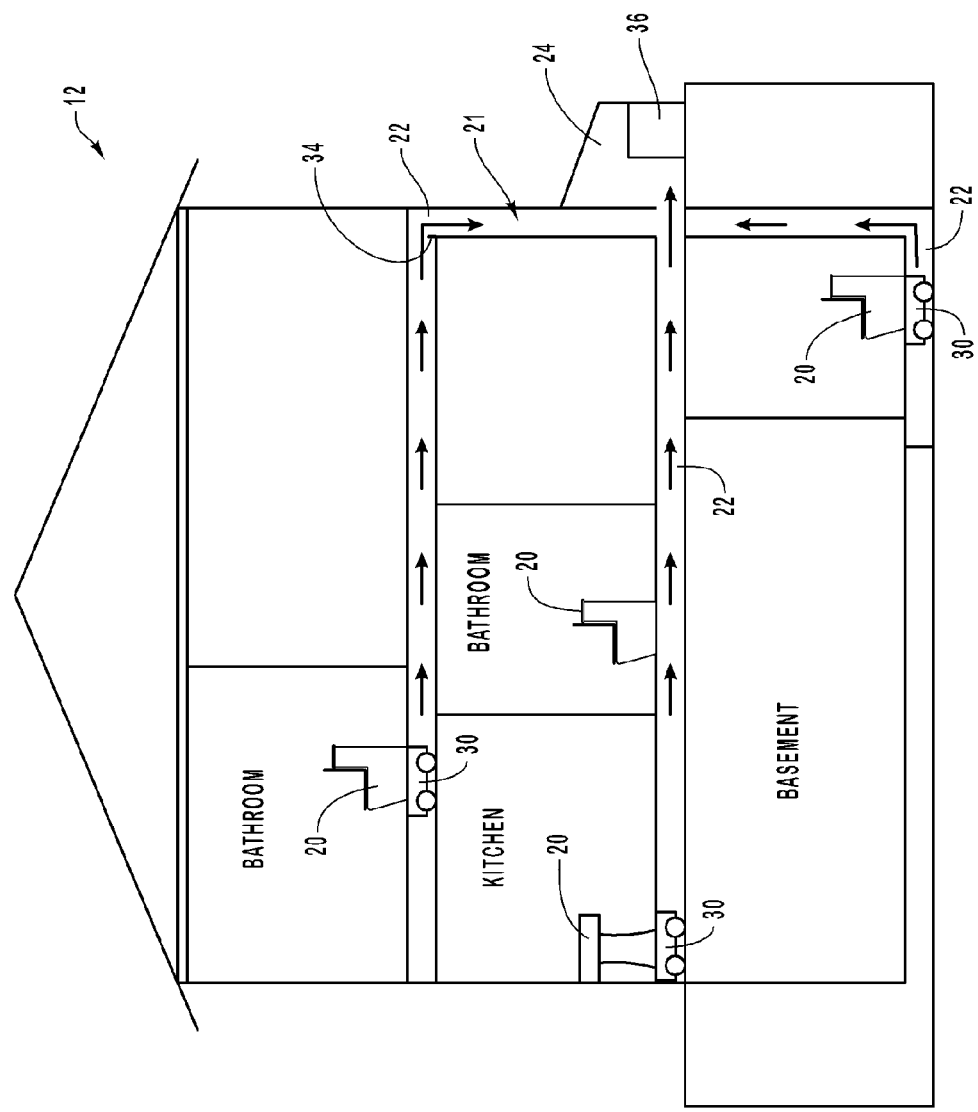
FIG. 12 illustrates a schematic partial cross-sectional side view representation of an exemplary building structure of the exemplary system of FIG. 1A, with associated collection receptacles, carts, network, and local storage according to one configuration of the present disclosure.

With reference to FIG. 12, and as mentioned above, building structure 12 includes transportation network 21. The transportation network 21 includes one or more shafts, tunnels, channels, chutes, pipes, or tubes, individually a transport member 22 and collectively transport members 22, that intersect and form a path through which one or more carts 30 can traverse. Additionally, network 21 includes one or more clean-out shafts or access shafts for those carts 30 that function as repair and cleaning carts. Thus, clean-out shafts or access shafts can be the same as the other transport members 22. These transport members 22 and clean-out shafts can be incorporated into the framework of building structure 12, either within an interior of or part of an exterior of building structure 12.

Disposed within or forming part of network 21 can be movable or stationary tracks, rails, cables, chains, belts, pneumatic systems, hydraulic systems 23 or other structures that serves as a transit system 23 (FIG. 2B) that aids with moving carts 30 through network 21. For instance, one or more carts 30 can have gears that mate with a movable track 23 associated with the transport members 22 so that movement of the track causes movement of the one or more carts 30. When a transit system 23 such as movable or stationary tracks, rails, cables, chains, belts, pneumatic systems, hydraulic systems 23 or other structures that serve as a transit system 23 are used, network 21 can also include one or more motors, such as, but not limited to, electric motors, that operate the tracks, rails, cables, chains, belts, pneumatic hoses, hydraulic hoses, or other structures.

The network includes one or more stops 34 in close proximity to those vertical or generally declining transport members 22 of network 21. These stops 34 prevent carts 30 from falling down such transport members 22, while optionally actuating carts 30 to deposit the collected bio-waste into such transport members 22.

Figure 13:
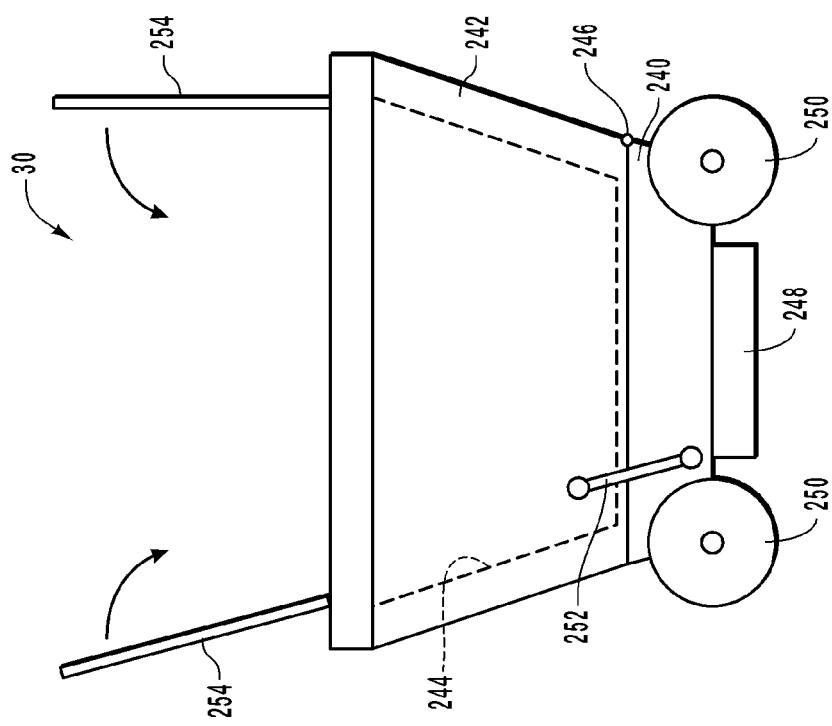
FIG. 13 illustrates a side view of an exemplary cart of the exemplary building structure of the exemplary system of FIG. 1A according to one configuration of the present disclosure.

The carts 30 used with network 21 can have various configurations, one of which is depicted in FIG. 13. As shown, cart 30 includes a base 240 that supports a body 242 having an interior compartment 244 that receives liner 54 (FIG. 2) and collected bio-waste. The body 242 is pivotally mounted to base 240 at a pivot point 246. The base 240 includes a motor 248 that powers wheels 250 under the control of hardware and software components (not shown) enabling cart 30 to move through transportation network 21 (FIG. 1A). The motor 248 can include one or more electric motors, hydraulic systems, and/or pneumatic systems powered by batteries, solar cells, electrical connections with the electrical network of building structure 12 (FIG. 1A), combinations thereof, or other manners of powering electric motors, hydraulic systems, and/or pneumatic systems. Motor 248 can also power an actuator 252, such as a hydraulic or pneumatic ram, a screw drive, or the like, that increase in length to cause body 242 to pivot relative to base 240 when cart 30 deposits the collected bio-waste into a transport member 22 upon encountering stop 34 (FIG. 12).

Upon depositing the collected bio-waste, the motor 248 can then shorten the length of the actuator 252 to close or return the body 242 to the position shown in FIG. 13. Furthermore, motor 248 can power one or more doors 254 pivotally attached to body 242 that close or seal compartment 244 when bio-waste is deposited therein. These doors 254 in combination with compartment 244, compact the bio-waste to form a bio-waste block or cube of bio-waste material.

Cart 30 is exemplary of one type of cart movable within transportation network. The present disclosure further contemplates the use of service carts that can move along clean-out shafts to repair transportation network 21 (FIG. 1A) and optionally retrieve damaged or inoperable carts. These service carts can include video equipments or cameras to aid with positioning the service carts and enable an operator to visualize problems with any carts or transportation network 21 (FIG. 1A). Further, these service carts can include cutting tools, arms and grabbers, cable tethers, or other structures to aid with retrieving inoperable carts and/or repair damaged portions of transport network 21 (FIG. 1A).

Figure 14:
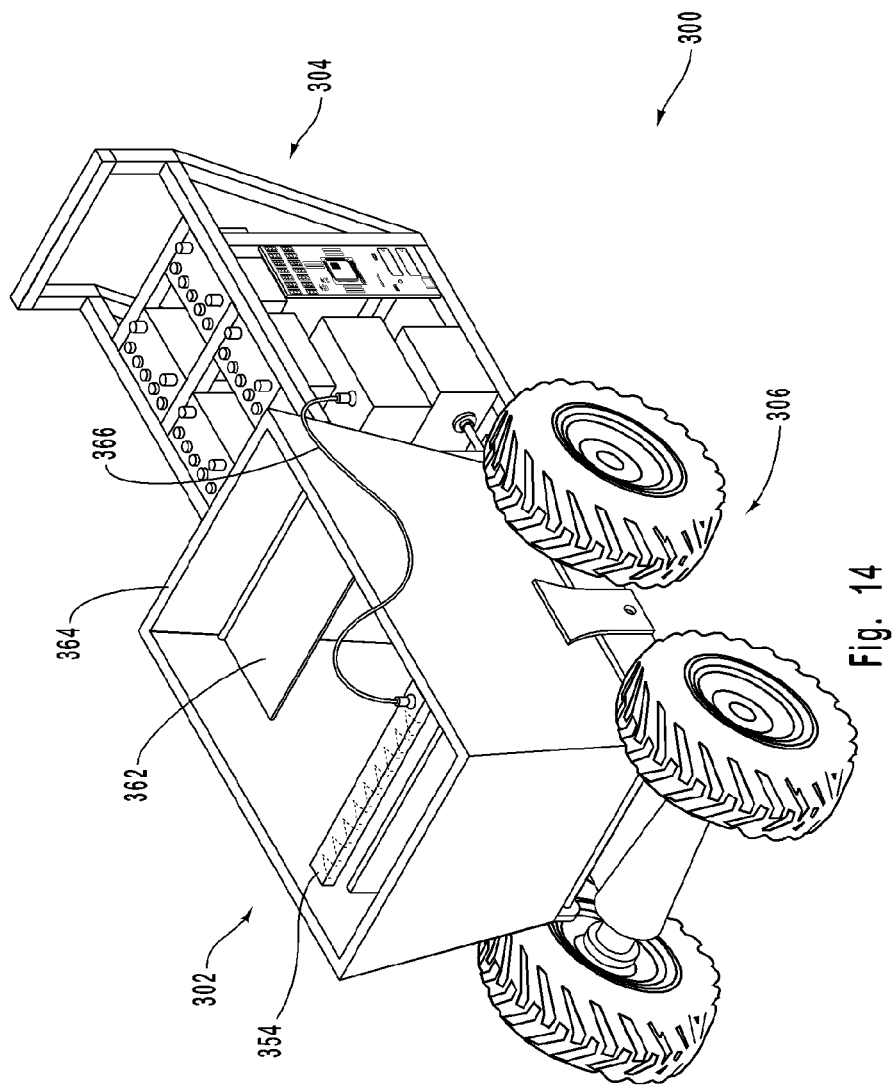
FIG. 14 illustrates a perspective view of another exemplary cart or vehicle of the present disclosure.
Figure 15:
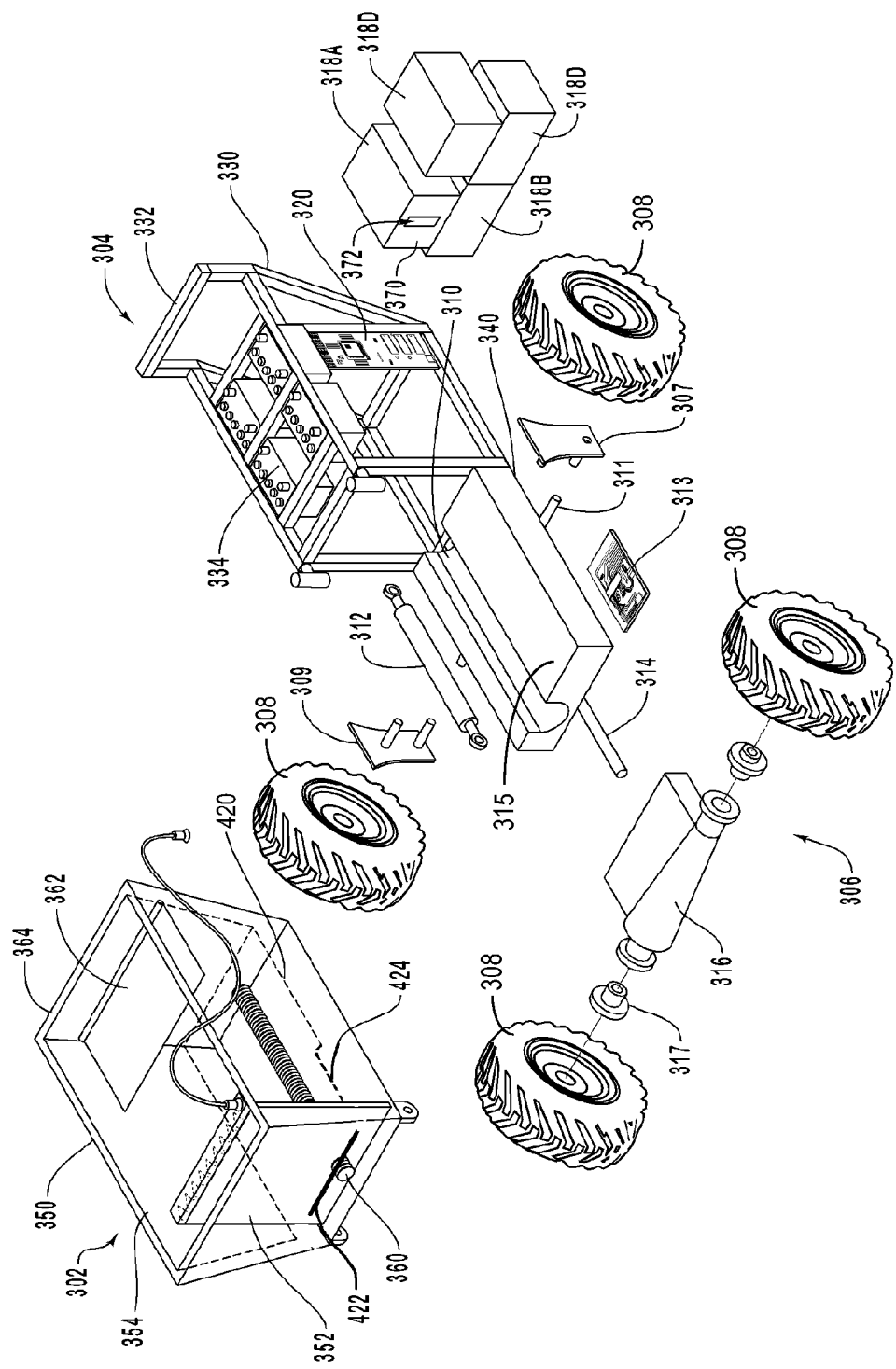
FIG. 15 illustrates an exploded view of the vehicle of FIG. 14.

FIGS. 14-16 show another configuration of a cart 300 that can be used with the network 21 of the present disclosure. The cart 300 is a remote-controlled vehicle for transporting the bio-waste collected from collection receptacles 20. Specifically, the cart or vehicle 300 collects liners 54 (or 154) containing bio-waste and absorbent material 74, can seal the liners 54 (if not sealed at collection receptacles 20), compacts the liners 54 of bio-waste to form bio-waste blocks or cubes of bio-waste material in sealed liners 54, and transports the liners 54 from the collection receptacles 20 (or 120) to various possible locations: local storage 24, a local recycle facility 26, a remote recycle facility 14, to machines (on-site or off-site) that can turn the blocks or cubes into energy, or to other desired locations on-site or off-site, such as a waste treatment plant.

FIG. 14 shows a perspective view of a remote-controlled vehicle 300. In FIG. 14, the vehicle 300 is shown as it would be when in motion, e.g., when transporting the liners from the collection receptacles 20 to any desired destination. As shown, vehicle 300 can include a bucket portion 302, a housing portion 304, and an underside 306.

FIG. 15 shows an exploded view of the remote-controlled vehicle 300 of FIG. 14. As shown, the remote-controlled vehicle 300 can include a bucket 350 for receiving bio-waste and liners 54, four wheels 308 as the mode of moving the vehicle 300, and a housing 330 for holding rechargeable batteries 334, an on-board computer 320, and groups of electric motors 318A-D. In the illustrated example, four batteries are provided to power four electric motors 318A-D.

Two of the wheels 308 are attached to a front wheel gear assembly 317 and two wheels 308 are attached to a wheel axle 311 at respective wheel mounting brackets 307 and 309. The rechargeable batteries 334 supply electricity to the electric motors 318A-D that perform various functions of the vehicle 300, and thereby provides the vehicle with a certain degree of self sufficiency.

The bucket portion 302 further comprises a heating element strip 354 for sealing the liners 54, a front wall 352 that serves as a blade for packing the liners 54 full of bio-waste and a drive screw 360 for compacting bio-waste liners 54,. A partial cover 362 can be used to cover a portion of the bucket portion 302. The partial cover 362 extends away from a rear wall 364, located opposite the front wall 352.

The housing portion 304 further comprises handles 332 for closing doors on the bucket 350, and a piston 312 extending from the group of electric motors 318. The underside portion 306 further includes a body 315 having a cylindrically-shaped mount 310 for housing a piston 312, a drive shaft 314 for controlling the front wheel gear drive 316 and that extends from the group of electric motors 318 to the front wheel gear drive 316, motor control boards 313 for interfacing with the computer 320 and the electric motors 318, and a underside chassis or frame 340 for holding these components in place.

In at least one example, one or more of the rechargeable batteries 334 may provide power to electric motor 318A to drive the drive screw 360, to electric motor 318B to drive the piston 312 to tilt the bucket portion 302, and to electric motor 318C to drive the front wheel gear drive 316. The drive screw 360 may be selectively coupled to the electric motors 318A. In particular, the electric motors 318A may have a bracket 370 having a slot 372 defined therein.

The configuration of the bracket 370 and slot 372 may allow the drive screw 360 to disengage from the electric motors 318A when the drive screw bucket portion 302 is tilted. Electric motors 318B may include a hydraulic pump connected to the piston 312. Electric motors 318C may also be directly connected to the drive shaft 314. Electric motors 318D may serve as auxiliary or backup motors and/or may be configured to perform additional functions. The connections described above may be made by rods, belts, shafts, or the like. Similarly, individual motors within the groups of motors 318A-D may similarly be coupled. Exemplary configurations of electric motors 318A-C and components associated therewith are illustrated in more detail in FIGS. 16A-16C.

FIG. 16A illustrates a partial exploded view of electric motor 318A and drive screw 360. As previously introduced, the electric motor 318A includes a bracket 370 that has a slot defined therein 372. The electric motor 318A includes a driving member 402. The driving member 402 is configured to selectively engage a driven member 404 coupled to the drive screw 360. While the bucket portion 302 is in a non-tilted configuration, illustrated in solid lines, the driving member 402 engages the driven member 404 such that as the driving member 402 rotates the driven member 404 also rotates thereby driving the drive screw 360. The front door 352 includes a threaded portion that engages the drive screw 360 such that as drive screw 360 rotates the front door 352 moves toward the rear wall 364 as described above. The drives screw may be rotated in the opposite direction to move the front door 352 away from the rear wall 364.

While in the non-tilted position, the walls of the bracket 370 that define the slot 372 may constrain movement of the driven member 404 as the driven member 404 is driven by the rotation of the driving member 402 in the horizontal direction while the weight of the bucket portion 302 and the drive screw 360 keep the driven member 404 in vertical contact with the driving member 402. The configuration illustrated is one example of providing selective engagement between the driving member 402 and the driven member 404 to allow disengagement of the driven member 402 when the bucket portion 302 is tilted. It will be appreciated that other configurations may be used to provide select engagement between the driving member 402 and the driven member 404.

As the bucket portion 302 is tilted as shown in phantom lines, the drive screw 360 and the driven member 404 are moved out of engagement with the driving member 404. As the bucket portion 302 is returned to the position illustrated in solid lines, the driven member 404 is returned to engagement with the driving member 404. In the example illustrated, the driving member 402 and the driven member 404 include gears. Other driving and driven members may also be provided as desired. In the illustrated example, the front door 352 includes a heating element 354 secured thereto and is driven relative to a rear wall 364 that includes a partial cover 362. It will be appreciated that the front door 352 may be stationary while a rear wall 364 is driven by the drive screw 360. Similarly, the partial cover 362 and the heating element 354 may be secured to either or both of the front door 352 and/or the rear wall 364.

FIG. 16B illustrates electric motor 318B operating piston 312 to tilt bucket portion 302 between an untilted position illustrated in solid lines and a tilted position illustrated in phantom lines. The piston 312 may be secured to the frame 340 at a location proximate the second electric motor 318B, illustrated as a rear piston pivot assembly 410. The piston 312 is able to rotate relative to the rear pivot assembly 410. An opposing end of the piston 312 is secured to the bucket portion 302, illustrated as a front piston pivot assembly 412. The piston 312 is also able to rotate relative to front piston pivot assembly 412. In the example illustrated, the front piston pivot assembly 412 is located above the rear piston pivot assembly 410 when the frame 340 is generally horizontal.

The bucket portion 302 is also coupled to the frame 340 at a front bucket pivot assembly 414. The front bucket pivot assembly 414 is able to rotate about the front bucket pivot assembly 414 as the piston 312 expands and compresses. The electric motor 318B may include a hydraulic pump contained therein that is coupled to the piston 312 by way of a hydraulic line 416. The electric motor 318B may thus drive the piston 312 as is well known in the art.

As previously introduced, the rear piston pivot assembly 410 can be located below the front piston pivot assembly 412. As the piston 312 expands, some portion of the force resulting from the expansion will cause the front piston pivot assembly 412 to move up from the frame 340 while another portion of the force will cause the front pivot assembly to move toward the front of the frame 340, thereby causing the bucket portion 302 to pivot about the front bucket pivot assembly 414 to tilt the bucket portion 302 as illustrated in phantom lines. Accordingly, the electric motor 318B may be configured to provide a motive force to the piston 312 to tilt the bucket portion 302. Additionally, the operation of the drive screw has been illustrated for ease of reference only. It will be appreciated that the drive screw may be located in a recess or shaft beneath and that a corresponding shaped front or rear wall or door may have a tab or other protrusion that extends into the recess to engage the drive screw. Other configurations are also possible for isolating or shielding the drive screw from liners or other items loaded into the bucket portion 302. In particular, as illustrated in FIG. 15, a shield 420 may be located over the drive screw 360. In such a configuration, the front wall 352 may move over the shield 420 and may include a slot 422 that allows the front wall 352 to travel over the shield 420 while retaining engagement with the drive screw 360. The shield 420 in turn may include one or more recess 424 to allow the lateral portions of the front door 352 to slide relative to the shield 420.

FIG. 16C illustrates electric motor 318C. In the illustrated example, the drive shaft 314 is secured directly to the drive motor 318C. The shaft 314 in turn is secured to the front gear assembly 317. Accordingly, the electric motor 318C may drive front wheels 318. Each of the electrically controlled by on-board computer 320.

In particular, utilizing the on-board computer 320, the vehicle 300 receives signals from a remote location, typically the control center 18, to perform a function and/or to travel to a particular destination for either pick-up of bio-waste or dumping of already collected bio-waste. These communications and requests can be made using any type of telecommunication network, including wireless, microwave, radio frequency, fiber optic, combinations thereof, or other telecommunication technology that enables transmitting and receiving, collectively transceiving, of signals. Once signals are received by the vehicle 300, the motor control board 306 interfaces with the computer 320 to actuate the electric motors 318A-D to perform the various functions that are performed by the vehicle 300.

In the embodiment of FIGS. 14 and 15, many of the functions are pre-programmed. For example, once the vehicle 300 receives bio-waste and absorbent material 74, the computer 320 is programmed to start all the functions of the vehicle 300 in sequence while the vehicle 300 is in motion. The computer 320 controls the opening and closing of the vehicle's doors, starts the heating element strip 354 to seal the liners 54 with the bio-waste and absorbent material 74 inside the liners 74 (if not sealed at collection receptacles 20), and then activates wall 352 and the drive screw 360 to compact the liners 54 of bio-waste and absorbent material 74 into bio-waste blocks or cubes. In this way, the vehicle 300 performs many functions automatically.

In at least one example, the drive screw 360 is rotated to move the front wall 360 toward the rear wall 364. As the front wall 360 advances toward the rear wall 352, the heating element 354 is moved toward contact with the partial cover 362. In at least one example, the drive screw 360 may advance the heating element 354 into contact with the partial cover 362. Such a configuration may act as a limit for the advancement of the front wall 360. Regardless of whether the heating element 354 comes into contact with the partial cover 362, the heating element 354 may apply heat to the liners 54. The liners 54 may be made of a material that shrinks and/or seals due to the application. The heating element 354 may receive power to heat the liners 54 from the rechargeable batteries 334, such as by way of a flex cable 366.

While the vehicle 300 is performing a compacting function, it also typically will be transporting the liners 54 of bio-waste and absorbent material 74 to one of several possible locations, which may be chosen at the discretion of the controller situated at the remote location (possibly the control center 18) or it will be transporting the liners 54 of bio-waste and absorbent material 74 to a pre-programmed location: local storage 24, a local recycle facility 26, a remote recycle facility 14, to machines (on-site or off-site)

that can turn the blocks or cubes into energy, or to other desired locations on-site or off-site, such as a waste treatment plant.

When the doors of the vehicle 300 are closed, the vehicle is performing the compacting function. After the liners 54 of bio-waste and absorbent material 74 are compacted into bio-waste blocks or cubes, however, the blocks are dumped over the front wall 352. Dumping destinations may include any of the destinations listed above, including, as mentioned above with respect to FIG. 12, depositing the collected bio-waste and absorption material 74 into a transport member 22, e.g., when a vehicle reaches a stop 34. As shown in FIG. 12, when dumped in this manner, the collected bio-waste and absorption material 74 is dumped into a vertical transport member 22, i.e., a stop 34 immediately precedes a vertical transport member 22. Although these are two disclosed mechanisms of vehicle 300 of FIG. 15, other dumping mechanisms are possible.

Figure 17:
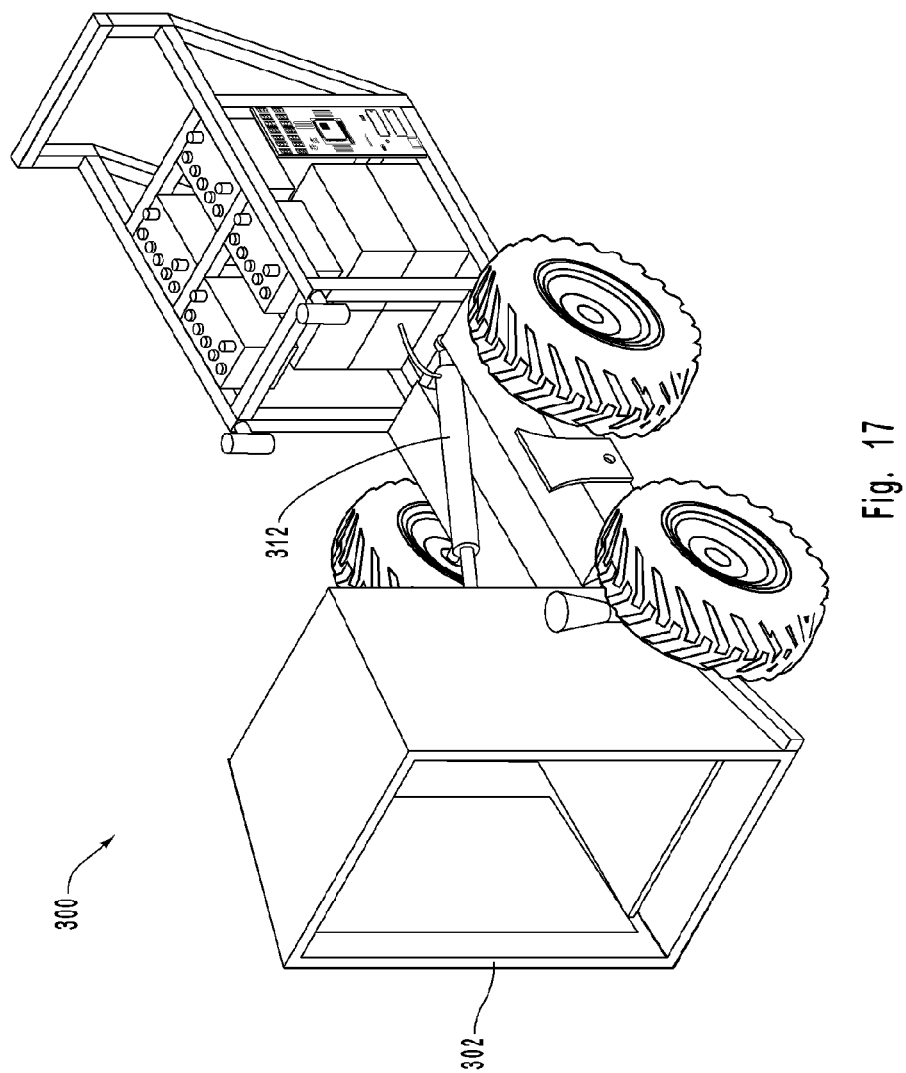
FIG. 17 illustrates a perspective view of the vehicle of FIG. 14 while performing an unloading operation.

For example, FIG. 17 shows a perspective view of the vehicle 300 of FIG. 14 while performing an unloading operation. Specifically, the bucket 350 tilts off of the underside portion 306 and rotates forward so that liners 54 of bio-waste and absorbent material 74 can drop out of the bucket 350 over wall 352. This event causes the bucket 350 to tilt forward, off of the underside portion C so that liners 54 of bio-waste and absorbent material 74 can drop out of the bucket 350 over wall 352.

The various functions of the vehicle 300 can be accomplished in many different ways, and the disclosure is not limited to the mechanisms disclosed. For example, the liners 54 can be sealed in methods additional to those disclosed. Also, the vehicle 300 itself may be designed differently and is not limited to that disclosed in the figures. To maneuver within the shafts, tunnels, channels, chutes, pipes, or tubes that collectively comprise the transport members 22 of a network 21, however, the vehicle 300 is approximately seven inches tall, approximately fifteen inches long, and approximately nine inches wide.

As mentioned previously, and with reference to FIG. 12, carts 30 transport the packaged bio-waste material to local storage 24. This local storage 24 can include one or more storage devices 36 that prepare the bio-waste material for long-term or short-term storage. The storage devices 36 can be manually operated by one or more users of building structure 12 or can automatically receive and process the collected bio-waste. Illustratively, storage devices 36 can include, but are not limited to, freezing devices, ozone treating devices, washing and sanitizing equipment, vacuum sealing device, such as, but not limited to, a plastic bag vacuum sealing device, or other devices or equipment that aids with preparing the bio-waste material for long-term or short-term storage. For instance, upon delivering the bio-waste material to local storage 24, storage device 36 can freeze the bio-waste material to enable storage of the same within a refrigerated area of local storage 24. In another configuration, upon delivering the bio-waste material to local storage 24, storage device 36 can vacuum seal the bio-waste material within a plastic container to enable storage of the same within local storage 24. Those skilled in the art know various manners and mechanisms to perform such functions.

Generally, the present disclosure provides mechanisms for collection, storing and optionally recycling bio-waste material produced in a building structure. The present disclosure provides mechanisms for transporting locally produced bio-waste material to a remote recycle facility that uses the bio-waste material as a fuel source. By so doing, methods, systems, and devices of the present disclosure alleviate the need for water as the primary carrier for removing bio-waste and preserve natural resources. Additionally, the present disclosure provides methods, system, and devices that can facilitate conversion of bio-waste material into an energy resource.

The present disclosure can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for collecting bio-waste material within a building structure and transporting the collected bio-waste material to a remote location without using water as a carrier of the bio-waste, the system comprising:
   a waterless building structure bio-waste collection system comprising:
      a waterless collection receptacle within a building structure for collecting bio-waste material;
      a waterless building structure transport network within the building structure, said waterless building structure transport network extending from said waterless collection receptacle; and
      a cart movable within said waterless building structure transport network, wherein the cart transports the collected bio-waste material through said waterless building structure transport network and compacts the collected bio-waste to form one or more bio-waste blocks; and
   a transportation network extending from said waterless building structure bio-waste collection system to a recycle facility remote from the building structure for transporting the collected bio-waste from said waterless building structure bio-waste collection system to the remote recycle facility where the collected bio-waste material, in the form of the one or more bio-waste blocks, is converted into electrical energy.

2. The system as recited in claim 1, wherein said transportation network comprises one or more roads, rails, or tunnels extending between the building structure and the remote recycle facility.

3. The system as recited in claim 1, wherein said transportation network comprises one or more vehicles or trains that carry the collected bio-waste material from the building structure to the remote recycle facility.

4. The system as recited in claim 3, wherein said one or more vehicles or trains comprise one or more sensors or receivers for receiving signals from a control center.

5. The system as recited in claim 4, wherein said signals direct said one or more vehicles or trains to collect the bio-waste material from said waterless building structure bio-waste collection system and transport the bio-waste material to the remote recycle facility.

6. The system as recited in claim 1, further comprising a control center that controls: (i) the collection of the bio-waste material from said waterless building structure bio-waste collection system; and (ii) the transportation of the bio-waste material to the remote recycle facility.

7. The system as recited in claim 6, wherein said waterless building structure bio-waste collection system further comprises a local control center that controls the collection of the bio-waste material within said waterless building structure bio-waste collection system.

8. The system as recited in claim 7, wherein said local control center is configured to communicate with said control center to coordinate collection of the bio-waste material from said waterless building structure bio-waste collection system by said transportation network.

9. A system for collecting bio-waste material within a building structure and transporting the collected bio-waste material to a remote location without using water as a carrier of the bio-waste, the system comprising:
   a waterless building structure bio-waste collection system for: (i) collecting bio-waste material from within the building structure without using water as a carrier of the bio-waste material; (ii) compacting the collected bio-waste to form one or more bio-waste blocks; and (iii) at least temporarily storing the collected bio-waste material at the building structure; and
   a transportation network extending from said waterless building structure bio-waste collection system to a recycle facility remote from the building structure, said transportation network being configured to transport the bio-waste material from said waterless building structure bio-waste collection system to the remote recycle facility where the collected bio-waste material, in the form of the one or more bio-waste blocks, is converted to electrical energy, and wherein the transport of bio-waste material is performed without using water as a carrier of the bio-waste material.

10. The system as recited in claim 9, wherein said waterless building structure bio-waste collection system comprises a waterless collection receptacle within a building structure for collecting the bio-waste material.

11. The system as recited in claim 9, wherein said waterless building structure bio-waste collection system comprises a local storage for at least temporarily storing the collected bio-waste material.

12. The system as recited in claim 9, wherein said waterless building structure bio-waste collection system comprise a waterless building structure transport network within the building structure, said waterless building structure transport network extending from a waterless collection receptacle to a local storage for transporting collected bio-waste material from said waterless collection receptacle to said local storage.

13. The system as recited in claim 12, wherein said waterless building structure transport network comprises a cart for transporting the collected bio-waste material from said waterless collection receptacle to said local storage and for compacting the collected bio-waste to form the one or more bio-waste blocks.

14. The system as recited in claim 9, wherein said transportation network comprises one or more roads, rails, or tunnels extending between the building structure and the remote recycle facility.

15. The system as recited in claim 9, wherein said transportation network comprises one or more vehicles or trains that carry the collected bio-waste material from the building structure to the remote recycle facility.

16. The system as recited in claim 9, further comprising a control center that controls: (i) the collection of the bio-waste material from said waterless building structure bio-waste collection system; and (ii) the transportation of the bio-waste material to the remote recycle facility.

17. A method for collecting bio-waste material within a building structure and transporting the collected bio-waste material to a remote location without using water as a carrier of the bio-waste, the method comprising:
   collecting bio-waste material in a waterless collection receptacle within a building structure;
   transporting the collected bio-waste from the waterless collection receptacle to a local storage without using water as a carrier of the bio-waste material
   compacting the collected bio-waste to form one or more bio-waste blocks; and
   transporting the bio-waste material from the building structure to a remote recycle facility where the collected bio-waste material, in the form of the one or more bio-waste blocks, is converted to electrical energy, and wherein the transporting is performed without using water as a carrier of the bio-waste material.

18. The method of claim 17, wherein collecting bio-waste material in a waterless collection receptacle comprises collecting bio-waste material in a liner in a waterless collection receptacle.

19. The method of claim 17, wherein transporting the collected bio-waste from the waterless collection receptacle to the local storage without using water as a carrier of the bio-waste material comprises conveying the collected bio-waste material from the waterless collection receptacle to the local storage via one or more carts.

20. The method of claim 17, wherein transporting the bio-waste material from the building structure to the remote recycle facility without using water as a carrier of the bio-waste material comprises conveying the bio-waste material from the building structure to the remote recycle facility via one or more vehicles or trains that travel along one or more roads, rails, or tunnels extending between the building structure and the remote recycle facility.

* * * * *